US012557202B2

(12) United States Patent
Louvrier et al.

(10) Patent No.: US 12,557,202 B2
(45) Date of Patent: Feb. 17, 2026

(54) STRATEGY FOR CONTROLLING CATHODE WIDTH VOLTAGE

(71) Applicant: GE Precision Healthcare LLC, Waukesha, WI (US)

(72) Inventors: Yannick Louvrier, Buc (FR); Julien Nicolle, Buc (FR); Antonio Caiafa, Waukesha, WI (US); Loic Cabrol, Buc (FR)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 199 days.

(21) Appl. No.: 18/484,341

(22) Filed: Oct. 10, 2023

(65) Prior Publication Data

US 2025/0120005 A1 Apr. 10, 2025

(51) Int. Cl.

| | |
|---|---|
| ***H01J 35/06*** | (2006.01) |
| ***H01J 35/14*** | (2006.01) |
| ***H05G 1/02*** | (2006.01) |
| ***H05G 1/08*** | (2006.01) |
| ***H05G 1/30*** | (2006.01) |
| ***H05G 1/32*** | (2006.01) |
| ***H05G 1/56*** | (2006.01) |
| ***H05G 1/58*** | (2006.01) |

(52) U.S. Cl.

CPC ............. *H05G 1/085* (2013.01); *H01J 35/06* (2013.01); *H01J 35/147* (2019.05); *H01J 35/153* (2019.05); *H05G 1/30* (2013.01); *H05G 1/32* (2013.01); *H05G 1/56* (2013.01); *H05G 1/58* (2013.01)

(58) Field of Classification Search

CPC ............ H05G 1/02; H05G 1/08; H05G 1/085; H05G 1/26; H05G 1/30; H05G 1/56; H05G 1/58; H05G 1/60; H05G 1/62; H01J 35/06; H01J 35/066; H01J 35/14; H01J 35/147; H01J 35/153

USPC .......... 378/91, 101, 113–118, 125, 137, 138, 378/144

See application file for complete search history.

(56) References Cited

U.S. PATENT DOCUMENTS 3,567,940 A * 3/1971 Lambert ................ H03K 17/10 378/106
4,334,153 A * 6/1982 Stehman .................. H05G 1/52 378/91
4,361,901 A * 11/1982 Daniels .................... H05G 1/56 378/112

(Continued)

*Primary Examiner* — Allen C. Ho
(74) *Attorney, Agent, or Firm* — McCoy Russell LLP

(57) ABSTRACT

Methods and systems are provided for controlling an electron beam generated by an x-ray tube assembly including a unipolar cathode. In one embodiment, a voltage supplied to the cathode is controlled by a multi-stage switching unit including a first control circuit and a second control circuit. A bias voltage for switching the cathode on is generated by a voltage source of the second control circuit, and a gridding voltage for switching the cathode off is generated by a plurality of voltage sources of the first control circuit. When transitioning between the bias voltage and the gridding voltage and vice-versa, a control strategy is used where the voltage sources of the first control unit are selectively engaged and/or disengaged in a non-consecutive order in accordance with an optimized protocol, to prevent a voltage imbalance between capacitors of different stages of the multi-stage switching unit.

18 Claims, 16 Drawing Sheets

(56) References Cited

U.S. PATENT DOCUMENTS

| | | | | | |
|---|---|---|---|---|---|
| 4,481,654 | A * | 11/1984 | Daniels | H05G 1/10 | 378/112 |
| 6,215,850 | B1 * | 4/2001 | Blake | H05G 1/32 | 378/114 |
| 7,450,689 | B2 * | 11/2008 | Soto | H05G 1/32 | 378/114 |
| 7,844,030 | B2 * | 11/2010 | Wilson | A61B 6/032 | 378/114 |
| 8,295,442 | B2 * | 10/2012 | Caiafa | H05G 1/52 | 315/408 |
| 8,396,185 | B2 * | 3/2013 | Zou | H01J 35/066 | 378/115 |
| 8,861,681 | B2 * | 10/2014 | Caiafa | H05G 1/10 | 378/111 |
| 9,160,325 | B2 * | 10/2015 | Caiafa | H05G 1/10 | |
| 9,253,864 | B2 | 2/2016 | Caiafa et al. | | |
| 10,032,595 | B2 * | 7/2018 | Lamaitre | H01J 3/18 | |
| 10,290,460 | B2 * | 5/2019 | Utschig | H05G 1/58 | |
| 10,692,684 | B2 | 6/2020 | Caiafa et al. | | |
| 10,893,839 | B2 * | 1/2021 | Fan | G06T 7/0012 | |
| 11,792,908 | B2 * | 10/2023 | Tang | H05G 1/56 | 378/119 |
| 12,382,569 | B2 * | 8/2025 | Louvrier | H05G 1/58 | |

* cited by examiner

1600

1620 1622 1624 1626 1628 1604 1602

| | | Optimized protocol | | | | | | | | |
|---|---|---|---|---|---|---|---|---|---|---|
| | | 8 | 7 | 6 | 5 | 4 | 3 | 2 | 1 | "Grid" |
| Steps 1610 | 1 | 0 | 0 | 0 | 0 | 0 | 0 | 0 | 0 | 0 |
| 1612 | 2 | 1 | 0 | 0 | 0 | 0 | 0 | 0 | 0 | -1 |
| 1614 | 3 | 0 | 1 | 1 | 0 | 0 | 0 | 0 | 0 | -2 |
| 1616 | 4 | 0 | 0 | 1 | 1 | 1 | 0 | 0 | 0 | -3 |
| | 5 | 0 | 0 | 0 | 1 | 1 | 1 | 1 | 0 | -4 |
| | 6 | 1 | 1 | 0 | 0 | 1 | 1 | 1 | 0 | -5 |
| | 7 | 1 | 1 | 1 | 1 | 0 | 1 | 1 | 0 | -6 |
| | 8 | 1 | 1 | 1 | 1 | 1 | 1 | 1 | 0 | -7 |
| | 9 | 1 | 1 | 1 | 1 | 1 | 1 | 1 | 1 | -8 |
| Drop level | | 5 | 5 | 5 | 5 | 5 | 5 | 5 | 1 | |

FIG. 16

STRATEGY FOR CONTROLLING CATHODE WIDTH VOLTAGE

TECHNICAL FIELD

The subject matter disclosed herein relates to X-ray tube radiation sources and more particularly to X-ray tube radiation sources having one or several electron beam control electrodes (e.g. gridding electrodes).

BACKGROUND

In imaging systems, X-ray tubes are used as a source of X-ray radiation in, among others, projection X-ray systems, fluoroscopy systems, tomosynthesis systems, and computer tomography (CT) systems. Typically, the X-ray tube includes a cathode and an anode. The cathode emits a stream of electrons in response to heat resulting from an applied electrical current via the thermionic effect and to an electric field due to a high voltage applied between the cathode and the anode. The anode includes a target that is impacted by the stream of electrons. The target, as a result, produces X-ray radiation and heat. Such systems are useful in medical contexts, but also for parcel and package screening, part inspection, various research contexts, and so forth.

The radiation traverses a subject of interest, such as a human patient, and a portion of the radiation impacts a detector or photographic plate where the image data is collected. In some X-ray systems, the photographic plate is then developed to produce an image which may be used by a radiologist or attending physician for diagnostic purposes. In digital X-ray systems, a photo detector produces signals representative of the amount or intensity of radiation impacting discrete pixel regions of a detector surface. The signals may then be processed to generate an image that may be displayed for review.

Interventional radiology (IR) refers to a subspecialty within radiology that affords minimally (or at least limited) invasive diagnosis and treatment of disease. Various equipment is provided to afford image guidance in connection with diagnosis and treatment of disease. Non-limiting examples of minimally invasive disease treatment include angioplasty and catheter delivered stents. A wide range of imaging modalities may be used to afford image guidance, such as X-ray equipment, ultrasound, MRI and other imaging modalities. Interventional radiologists may utilize imaging equipment during a procedure to obtain images that are used in connection with directing interventional instruments through the body. For example, interventional instruments may utilize needles, catheters and the like.

A voltage supplied to electrodes of the cathode of an interventional imaging system may be controlled to block the X-rays or to adjust the intensity of X-rays that are generated. With respect to controlling this electrode voltage, it is desirable to be able to produce fast transitions from low to high levels (e.g., grid to bias levels), as well as to control electrode voltage waveforms after transition (e.g., stabilization time, accuracy, ripple, etc.) to correctly control the electron beam. Various factors may influence transition times.

SUMMARY

In an example, a method for an interventional imaging system comprises applying a voltage to a gridding electrode of a cathode of the interventional imaging system via a multi-stage switching unit including a first control circuit and a second, different control circuit; during a first transition of the voltage from a first, gridding voltage of the interventional imaging system generated by the first control circuit to a second, bias voltage of the interventional imaging system generated by the second control circuit, selectively bypassing a plurality of stages of the first control circuit sequentially in a first non-consecutive order to decrease the voltage from the first, gridding voltage to a common voltage of the interventional imaging system; and during a second transition of the voltage from the second, bias voltage generated by the second control circuit to the first, gridding voltage generated by the first control circuit, selectively engaging the plurality of stages of the first control circuit sequentially in a second non-consecutive order to increase the voltage from the common voltage to the first, gridding voltage.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which:

FIG. 16 shows an optimized protocol for controlling the transition from the bias voltage to the gridding voltage, in accordance with one or more embodiments of the present disclosure.

DETAILED DESCRIPTION

Figure 1:
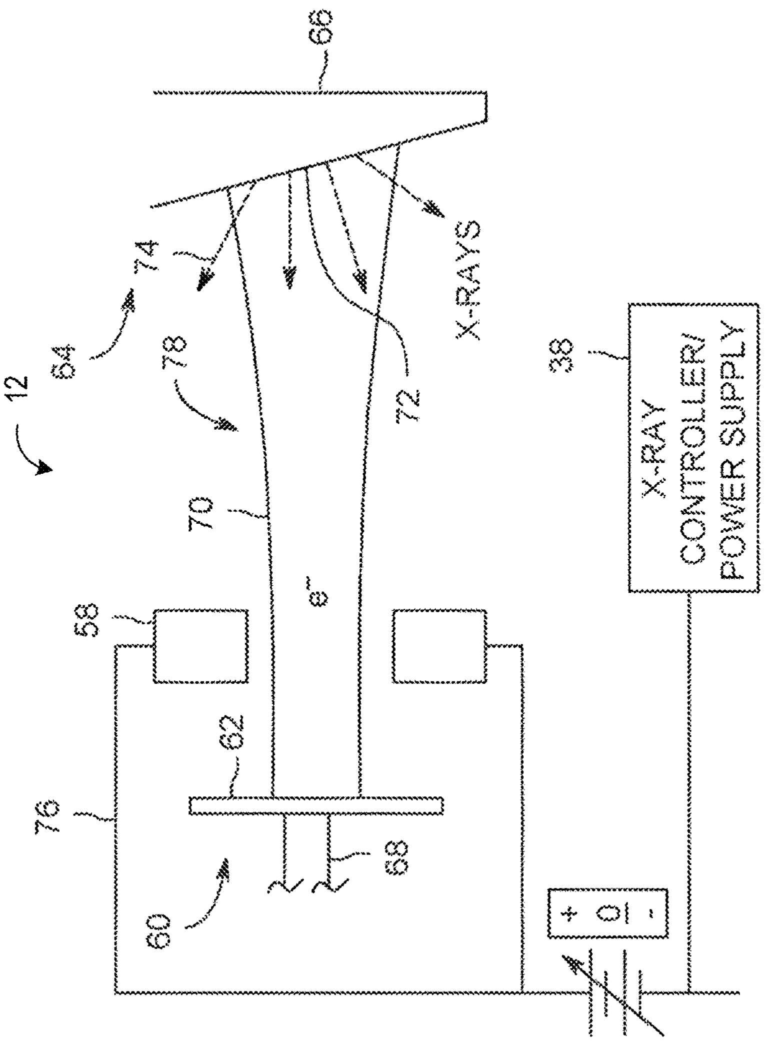
FIG. 1 is a schematic illustration of an embodiment of a portion of an X-ray tube (e.g., having a gridding electrode) coupled to an X-ray controller/power supply (e.g., with no gridding of an electron beam), in accordance with various embodiments.

Methods and systems are described herein for generating voltage profiles that may be used to control an electron beam (e.g., control of intensity and/or energy) generated by an X-ray tube assembly of an interventional imaging system. It should be noted that although various embodiments may be described in connection with an X-ray tube assembly having a particular configuration, other configurations, geometries and arrangements are contemplated.

The X-ray tube includes a cathode that emits a stream of electrons in response to heat resulting from an applied voltage, and an anode including a target that is impacted by the stream of electrons to generate X-rays (e.g., to perform one or more X-ray exposures on a patient of the interventional imaging system). The voltage is applied at a gridding electrode of the cathode to switch the cathode on (e.g., a bias voltage to generate the X-rays) or off (e.g., a grid voltage to stop generation of the X-rays).

Voltage changes for switching the cathode on and off may be generated by driving electronics of the cathode that are connected through a cable. The cable may vary in length, from around 0.5 m to around 40 m. However, an approach for controlling the cathode through a shorter cable may be less effective when applied to a cathode controlled through a longer cable. Compounding factors may include a polarity of the cathode. The cathode may be bipolar, where the gridding voltage is of a first polarity (e.g., negative) and the bias voltage is of an opposite polarity (e.g., positive), or the cathode may be unipolar, where both the gridding voltage and the bias voltage are of a single polarity (e.g., negative). An approach for controlling a bipolar cathode may be less effective when applied to a unipolar cathode. As a result, current electronics topologies may not be suitable to drive a bipolar cathode via a long cable, due to a degree of voltage precision relied on when a bias voltage is applied.

In particular, some approaches for driving a bipolar cathode through a longer cable may be unnecessarily complex and expensive, and less compact when applied to unipolar cathodes. Other, less complex approaches for driving a bipolar cathode through a shorter cable may lead to slower transitions, higher losses, and potential inaccuracies when applied to cathodes driven through longer cables. One common problem is a temporary drop of cathode voltage when switched from a first voltage to a second voltage. The temporary voltage drop is related to the length of the cable (e.g., due to parasitic capacitance associated with the cable). The temporary voltage drop may be irrelevant (e.g., very small in amplitude and short in duration) when the cable is short (e.g., 0.5 m) but may become unmanageable for longer cables. Thus, current approaches to driving the cathode may not be feasible with newer, top-of-the-line interventional imaging systems with unipolar cathodes, which may rely on cables with lengths of 40 m or more.

To address this issue, a switching unit for controlling a unipolar cathode via a longer cable may be used, where the switching unit has a multi-stage topology including a first control circuit for generating the gridding voltage, and a second control circuit for generating the bias voltage. By separating the two functions, a duration of a transition from the gridding voltage to the bias voltage and vice-versa may be decreased by performing the transition in two steps: a larger step that may be performed rapidly with low precision using the first control circuit, and a smaller step that may be performed with higher precision using the second control circuit. Each of the gridding voltage and the bias voltage may be generated starting from a common voltage (considered herein to be 0V for simplicity). That is, during a first transition from the gridding voltage to the bias voltage (e.g., switching on the cathode), the electrode voltage applied to the cathode is adjusted first to the common voltage (the larger step) and then to the bias voltage (the smaller step with higher precision). During a second transition from the bias voltage to the gridding voltage (e.g., switching off the cathode), the electrode voltage applied to the cathode is adjusted first to the common voltage (the smaller step) and then to the gridding voltage (the larger step). By performing the first transition and the second transition in this manner, the duration may be less than a threshold duration for driving the unipolar cathode via the longer cable.

However, one problem with this approach is that a capacitor voltage imbalance between stages of the multi-stage switching unit may occur specifically during the larger step of the transitions from the low gridding voltage (e.g., −8 kV) to the common voltage (e.g., 0V) and vice-versa, which may damage components of the first control circuit. While the physics of the transition apply to the smaller step as well, the effect is minimal due to a relatively small voltage change entailed by switching from the common voltage to the bias voltage (e.g., −1.2 kV) and vice-versa. As described in greater detail below, the first control circuit includes a plurality of stages, each with a capacitance pre-charged to 1 kV. The plurality of stages are engaged when the desired cathode voltage is −8 kV (cathode gridded off), and the plurality of stages are disengaged (e.g., bypassed) when the cathode desired voltage is the common voltage (e.g., 0V). Each time that a stage of the plurality of stages is engaged/disengaged, there is an energy transfer to/from the cable and cathode capacitance, as well as energy losses due to switching.

A straightforward way to control the first control circuit is to engage/disengage the plurality of stages at the same time. However, this operation may generate high energy losses, a mainly, unacceptable current and voltage constraints on the electric components of the switching unit. Alternatively, the stages can be engaged/disengaged sequentially, leading to an almost 10× decrease in the current and voltage constraints.

However, taking full advantage of the energy saving may rely on timing the engaging/disengaging of each stage such that each stage reaches a steady state, to recover the capacitor charge/discharge. The timing-to-steady-state may be dependent on a stage capacitance value and a load capacitance value (which includes a cable capacitance), which may be negligible in a computed tomography (CT) system, but may be unmanageably long in an interventional imaging system due to the longer cable length. Suboptimal energy saving can still be achieved even if the timing between engaging two consecutives stages is not reached, therefore is still advantageous operating them sequentially.

The capacitor voltage imbalance between stages may temporarily arise when stages are operated sequentially with a short time between two consecutives stages. Indeed, as stages are engaged/disengaged progressively to the output and as engaged stages' capacitors are charged/discharged at each step, there will be a unbalance between stages, leading to higher voltage constraints and higher timing-to-steady-state for stages that are connected to the output for the longest duration during transitions. While this issue may clear itself after a relevant stage reaches the steady state, it adds stresses to parts of the circuit that may lead to premature aging and, in the worst cases, immediate parts failure. The aging and potentially sudden parts failure can be avoided by choosing larger rated components, but the larger rated components may use more space and may be more expensive. Since space is quite limited, this approach may not be desirable.

To address the problem of the aging and potentially sudden parts failure due to the capacitor voltage imbalance without relying on the larger rated components, a control strategy is proposed herein for controlling the engagement/disengagement of the stages of the first control circuit in such a way that the unbalance is kept at a minimum even before steady state is reached at each step, via alternative stage switching during the transitions, which allows most or all of the stages to be connected to the output during transitions for a same duration.

FIGS. 1-5, 10, and 11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below/underneath one another, at opposite sides to one another, or to the left/right of one another may be referred to as such, relative to one another. Further, as shown in the figures, a topmost element or point of element may be referred to as a “top” of the component and a bottommost element or point of the element may be referred to as a “bottom” of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Figure 2:
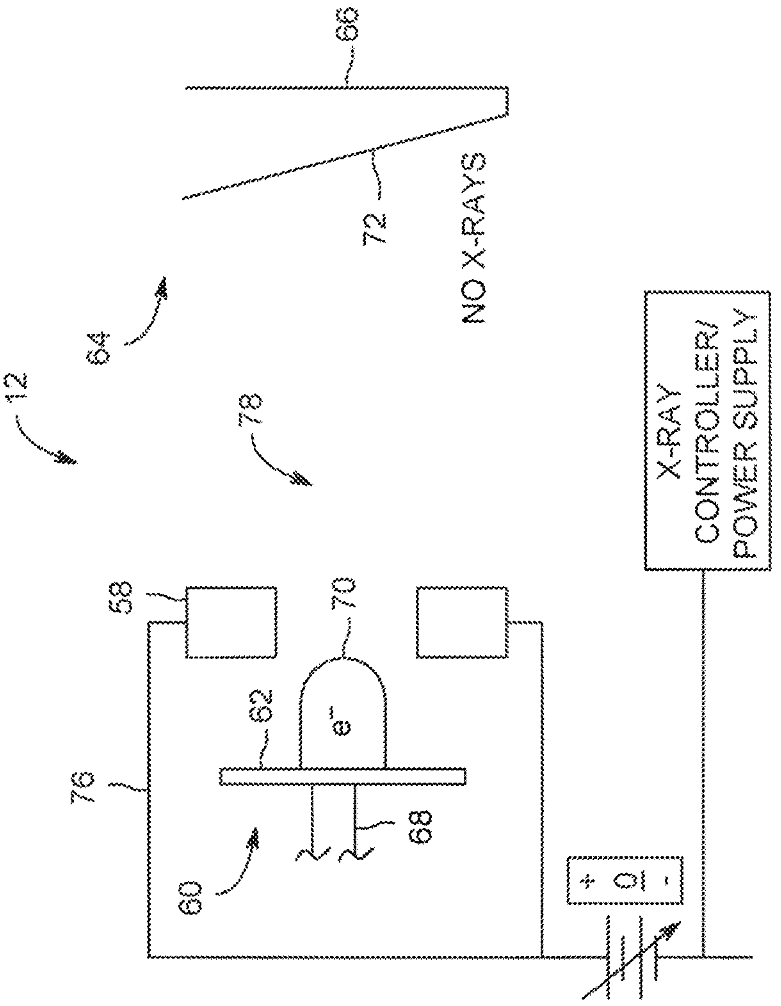
FIG. 2 is a schematic illustration of an embodiment of a portion of an X-ray tube (e.g., having a gridding electrode) coupled to an X-ray controller/power supply (e.g., with gridding of an electron beam), in accordance with various embodiments.

FIGS. 1 and 2 are schematic illustrations of an embodiment of a portion of an X-ray tube 12 (e.g., having a gridding electrode 58) coupled to an X-ray controller/power supply 38 (e.g., without gridding an electron beam). The X-ray tube 12 includes an electron beam source 60 including a cathode 62, an anode assembly 64 including an anode 66, and a gridding electrode 58. The cathode 62, anode 66, and the gridding electrode 58 may be disposed within an enclosure (not shown) such as a glass or metallic envelope. The X-ray tube 12 may be positioned within a casing (not shown) which may be made of aluminum and lined with lead. In certain embodiments, the anode assembly 64 may include a rotor and a stator (not shown) outside of the X-ray tube 12 at least partially surrounding the rotor for causing rotation of an anode 66 during operation.

The cathode 62 is configured to receive electrical signals via a series of electrical leads 68 (e.g., coupled to a high voltage source) that cause emission of an electron beam 70. The anode 66 is configured to receive the electron beam 70 on a target surface 72 and to emit X-rays, as indicated by dashed lines 74, when impacted by the electron beam 70 as depicted in FIG. 2. The electrical signals may be timing/control signals (via the X-ray controller/power supply 38) that cause the cathode 62 to emit the electron beam 70 at one or more energies. Further, the electrical signals may at least partially control the potential between the cathode 62 and the anode 66. The voltage difference between the cathode 62 and the anode 66 may range from tens of thousands of volts to in excess of hundreds of thousands of volts. The anode 66 is coupled to the rotor (not shown) via a shaft (not shown). Rotation of the anode 66 allows the electron beam 70 to constantly strike a different point on the anode perimeter. Within the enclosure of the X-ray tube 12, a vacuum of the order of $10^{-5}$ to about $10^{-9}$ torr at room temperature is preferably maintained to permit unperturbed transmission of the electron beam 70 between the cathode 62 and the anode 66.

Figure 3:
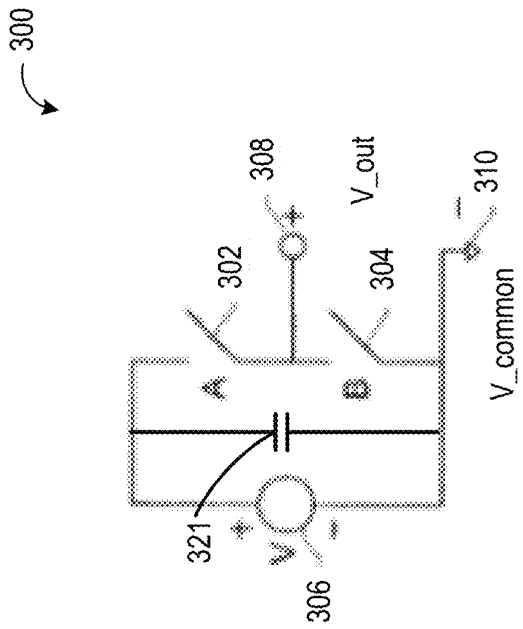
FIG. 3 is a schematic diagram of a switching unit of the X-ray tube, in accordance with one or more embodiments.

The gridding electrode 58 is configured to receive electrical signals via a series of electrical leads 76 that cause the gridding electrode 58 to grid the electron beam 70. The electrical signals may be timing/control signals (via the X-ray controller/power supply 38) that cause the gridding electrode 58, when energized or powered to a specific level (e.g., less than +6000 V to −5000 V), to grid the electron beam 70. The gridding electrode 58 is disposed about a path 78 of the electron beam 70 between the electron beam source 60 (e.g., cathode 62) and the anode assembly 64 (e.g., anode 66). The gridding electrode 58 may be annularly shaped. As depicted in FIG. 3, when the gridding electrode 58 is powered to a specific level (e.g., −3000 V to −5000 V), the electron beam 70 may be fully gridded or blocked from impacting the anode 66. In certain embodiments, when the gridding electrode is energized at a different level (e.g., less than +6000 V and to −3000 V), the electron beam 70 may be partially gridded resulting in the reduction of the electron beam 70 that impacts the anode 66. If the gridding electrode 58 is powered at a specific non-gridding level (e.g., +6000V), gridding of the electron beam 70 does not occur (as depicted in FIG. 2). As discussed in greater detail below, the gridding of the electron beam 70 by the gridding electrode 58 is synchronized with the planned transitions (e.g., unstable portions) during a dynamic focal spot mode. The gridding of the electron beam 70 may occur in a binary manner (e.g., on (no gridding)/off (gridding)). In other embodiments, the gridding of the electron beam may occur by switching between full gridding and partial gridding states. In other embodiments, the gridding of the electron beam may occur by switching between no gridding and partial gridding. In some embodiments, a constant partial gridding may be applied to the electron beam.

Various combinations of bias voltages and currents may be employed to control the electron beam. In particular, different circuits that may be used to form a multi-stage control arrangement will now be described, which may be implemented as a multi-stage architecture or topology having voltage supplies generated at the X-ray controller/power supply 38. The stages may be configured to change the voltage fast, such as sub-micron seconds, control the maximum voltage and/or control the shape of the waveforms used to apply the voltage to the gridding electrode 58. The stages may each be configured differently to allow switching at different speeds.

For example, FIG. 3 illustrates a switching unit 300, which may be used to form a stage of a multi-stage architecture or topology. It should be noted that the switching units may be formed from different types of switching devices. In various embodiments, the switching devices are transistors, such as metal-oxide-semiconductor field-effect transistors (MOSFETs). However, any type of switching device may be used, such as an Insulated Gate Bipolar Transistor (IGBT), which may be formed from different materials, such as Silicon (Si), Silicon Carbide (SiC), Gallium Arsenide (GaAs), or any other material suitable to build such devices.

The switching unit 300 includes a pair of switches 302 and 304 (connected in series) that are each independently controllable to provide voltage switching from a reference voltage, illustrated as a voltage source 306. In this embodiment, the switch 302 is labeled switch A and the switch 304 is labeled switch B with the voltage output (Vout) 308 between the switches 302 and 304. The switching unit 300 includes a capacitor 321, which is connected to the switches 302 and 304 in parallel with the voltage source 306. Voltage source 306 generates a charge at capacitor 321, which may be discharged depending on a configuration of the switches 302 and 304.

In operation, in various embodiments, one of the switches 302 and 304 is closed (ruining a short in a closed state) and the other switch is open (in an open state). For example, if the switch 304 is closed and the switch 302 is open, Vout=Vcommon, which in various embodiments is zero volts (illustrated as ground 310 in FIG. 3). If the switch 304 is open and the switch 302 is closed, Vout=Vcommon+V.

Figure 4:
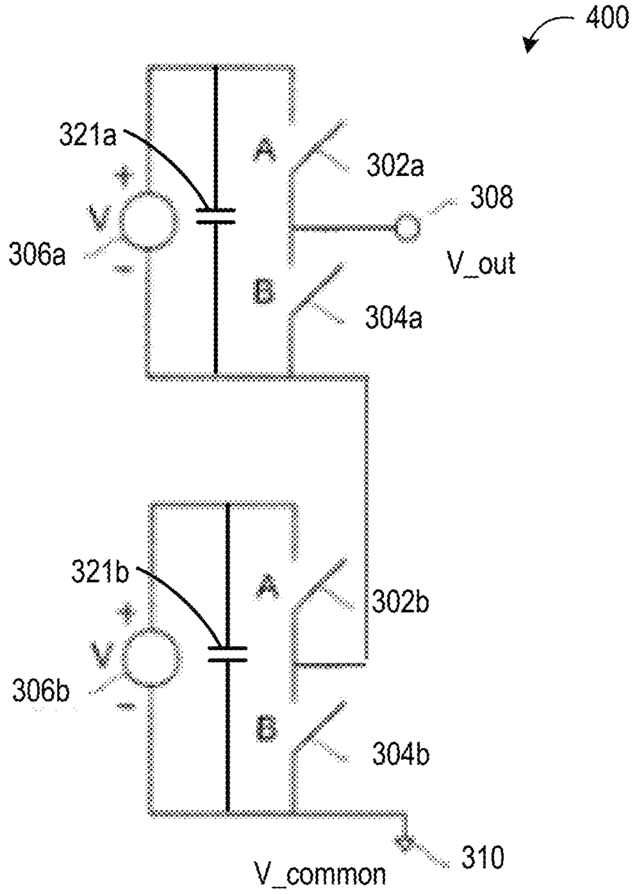
FIG. 4 is a schematic diagram illustrating a first multi-stage topology using the switching unit shown in FIG. 3, in accordance with one or more embodiments.

The switching units 300 may be combined or cascaded, for example, to form a multi-stage switching unit 400 shown in FIG. 4. It should be noted that like numerals represent like parts. Additionally, while FIG. 4 illustrates two stages, additional stages may be provided as described in more detail herein. It should be noted that for each of the switching units 300, during a particular state of operation, one of the switches 302 or 304 is open and the other switch 304 or 302 is closed.

In operation, if the switches 304*a* and 304*b* are closed (in which case the switches 302*a* and 302*b* are open), voltage sources 306*a* and 306*b* and capacitors 321*a* and 321*b* are not connected to the output and Vout=Vcommon. If the switch 304*b* is open and the switch 304*a* is closed (in which case the switch 302*b* is closed and the switch 302*a* is open), voltage source 306*a* and capacitor 321*a* are not connected to the output, voltage source 306*b* and capacitor 321*b* are connected to the output and Vout=Vcommon+V. Similarly, if the switch 304*b* is closed and the switch 304*a* is open (in which case the switch 302*b* is open and the switch 302*a* is closed), voltage source 306*a* and capacitor 321*a* are connected to the output, voltage source 306*b* and capacitor 321*b* are not connected to the output and Vout=Vcommon+V. If both switches 304*a* and 304*b* are open (in which case both switches 302*a* and 302*b* are closed), voltage sources 306*a* and 306*b* and capacitors 321*a* and 321*b* are connected to the output and Vout=Vcommon+V+V. Thus, in this operating state, the reference voltages from the two stages are summed. Accordingly, as more stages are added, incremental increases in output voltage are possible (e.g., discrete changes) by opening and closing the various switches in one or more of the stages. For example, if an output voltage (Vout) of 6 kV is desired, six switching units 300, each with a 1 kV reference voltage source 306, may be connected similar to the arrangement shown in FIG. 4. Additionally, by controlling the switches as described herein, incremental increases of 1 kV between 0 kV and 6 kV may be generated using 1 kV reference voltage sources 306. The role of the capacitor 321 of each stage, as described above for the one stage configuration of FIG. 3, is to limit a temporary voltage decrease or increase from the 1 kV reference voltage of the stage at the time the 1 kV reference and capacitor of the stage are connected to the output and the output voltage changes. It should be noted that as a result of each switching unit 300 in this example having a reference voltage of 1 kV, the rating of the switches 302 and 304 can be 1 kV, instead of 6 kV, and still providing a maximum output voltage from the multi-stage arrangement of 6 kV. It also should be noted that the reference voltage at different stages may be different. For example, some stages may have a 1 kV reference voltage while other stages have a 2 kV reference voltage. Other reference voltage values may be provided, which may be non-integer values.

Figure 5:
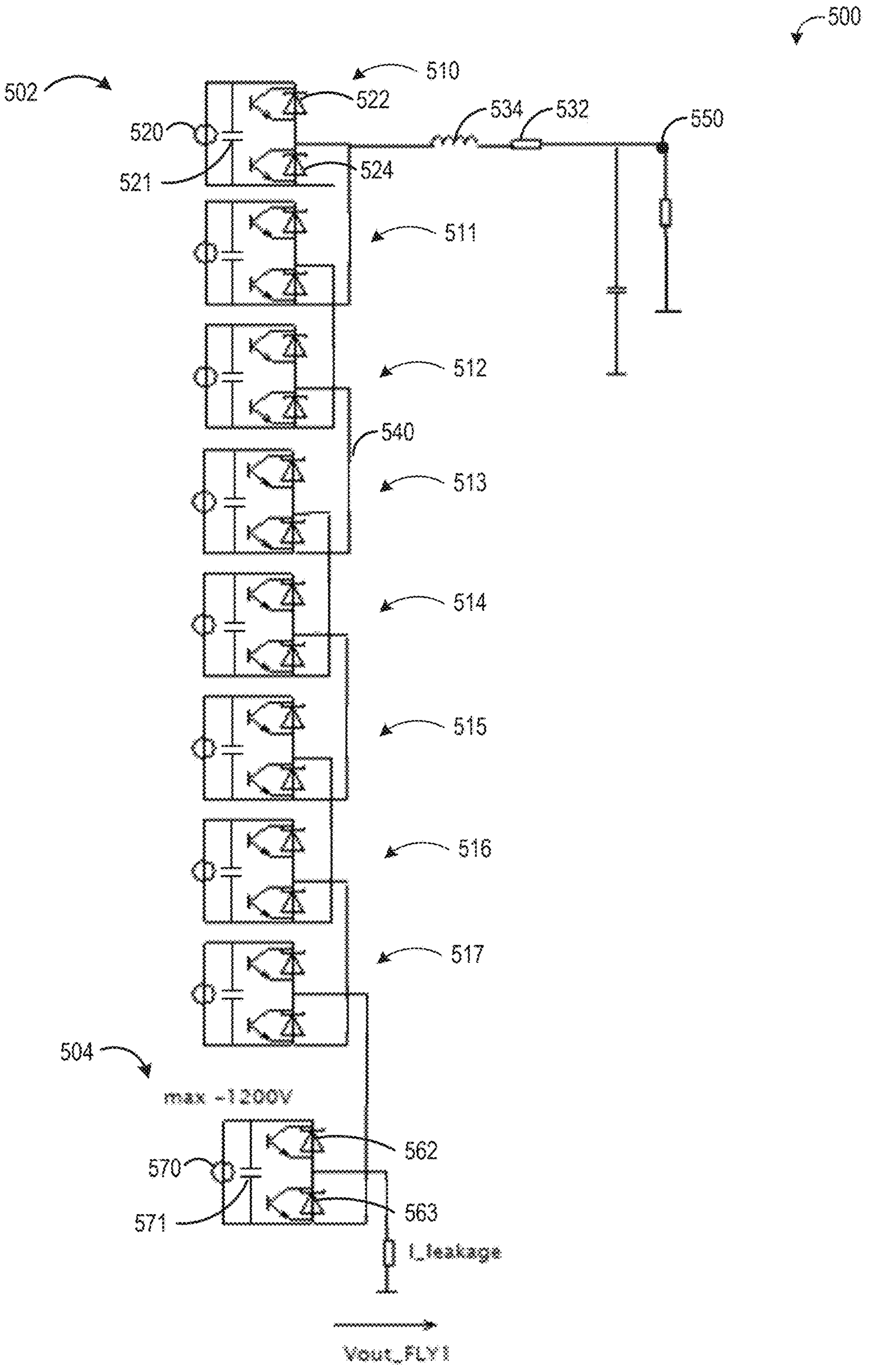
FIG. 5 is a schematic diagram illustrating a second multi-stage topology using the switching unit shown in FIG. 3, in accordance with one or more embodiments.

FIG. 5 shows an exemplary multi-stage switching unit 500 comprising multiple combined or cascaded switching units 300 in a multi-stage architecture or topology. Multi-stage switching unit 500 shows an electronics topology for a unipolar cathode of an interventional imaging system that can be gridded (e.g., switched off) and biased (e.g., switched on) with voltage of just one polarity (negative polarity). Specifically, the unipolar cathode may be controlled by applying an output electrode voltage (e.g., Vout 308) to a gridding electrode 550, where the output voltage (also referred to herein as the electrode voltage) is outputted by multi-stage switching unit 500. Multi-stage switching unit 500 advantageously separates the generation of the gridding voltage and the bias voltage at the gridding electrode 550, where the gridding voltage is generated by a first control circuit 502, and the bias voltage is generated by a second control circuit 504.

First control circuit 502 includes eight switching units (also referred to herein as stages): a first stage 510, a second stage 511, a third stage 512, a fourth stage 513, a fifth stage 514, a sixth stage 515, a seventh stage 516, and an eighth stage 517. In other embodiments, first control circuit 502 may include a different number of switching units, depending on a demand for an amount of voltage. Each stage may be a non-limiting example of a switching unit 300 of FIGS. 3 and 4, where each stage includes a voltage source 520, a first switch 522, and a second switch 524 (e.g., voltage source 306 and switches 302 and 204, respectively). However, in contrast with switching unit 300 and multi-stage switching unit 400, multi-stage switching unit 500 is a unipolar unit that generates negative gridding and bias voltages (e.g., the gridding voltage and bias voltage are both negative voltages applied to gridding electrode 550). Unlike multi-stage switching unit 400 of FIG. 4, in the electronics topology of multi-stage switching unit 500, monopolar bridges 540 are used to connect each stage of multi-stage switching unit 500.

In various embodiments, each voltage source 520 of each stage of first control circuit 502 may supply a voltage of up to 1 kV via a respective capacitor 521 (e.g., capacitor 321 of FIG. 3). Thus, a total electrode voltage outputted by first control circuit 502 may be −8 kV, when all stages are connected negatively to the output (e.g., a sum of −1 kV outputs from each of stages 510-517). The total electrode voltage may be a negative gridding voltage greater in magnitude than a threshold voltage (e.g., −5.5 kV), where a first voltage greater than the threshold voltage does not generate an X-ray, and a second voltage less than the threshold voltage may generate an X-ray. In other words, the interventional imaging system may be switched off by applying a total electrode voltage, via stages 510-517, that exceeds the threshold (e.g., the gridding voltage), and the interventional system may be switched on by applying a total electrode voltage less than the threshold voltage. In other embodiments, a different number of stages may be used and/or voltage sources supplying a different amount of voltage may be used to generate a different total voltage that exceeds the threshold voltage.

During bias to grid transitions, all capacitors 521 of stages 510-517 will be slightly discharged due to a discharge current used to offset the parasitic capacitance generated by cable used to control the unipolar cathode. Thus, immediately after a bias to grid transition (for instance, after 50 μs), the total electrode voltage supplied by the respective capacitors 521 of stages 510-517 will be less than an expected nominal voltage (e.g. the number of stages multiplied by the reference voltage), but still greater than a threshold voltage (e.g., −5.5 kV) to not generate an X-ray. After a longer time (for instance, 5 ms), capacitors 521 of stages 510-517 will achieve the nominal voltage value with voltage sources 520 of the stages 510-517. This temporary voltage drop is described in greater detail below in reference to FIG. 8. In some examples, the length of the cable may be 40 m or greater, with an overall capacitance of close to 7 nF. In some embodiments, the first control circuit 502 may include a resistor 532, and an inductor 534, which may limit a peak current during the transition, minimize energy losses due to the parasitic capacitance during the transition, and/or protect the electronics of first control circuit 502 from tube arcing.

Figure 10:
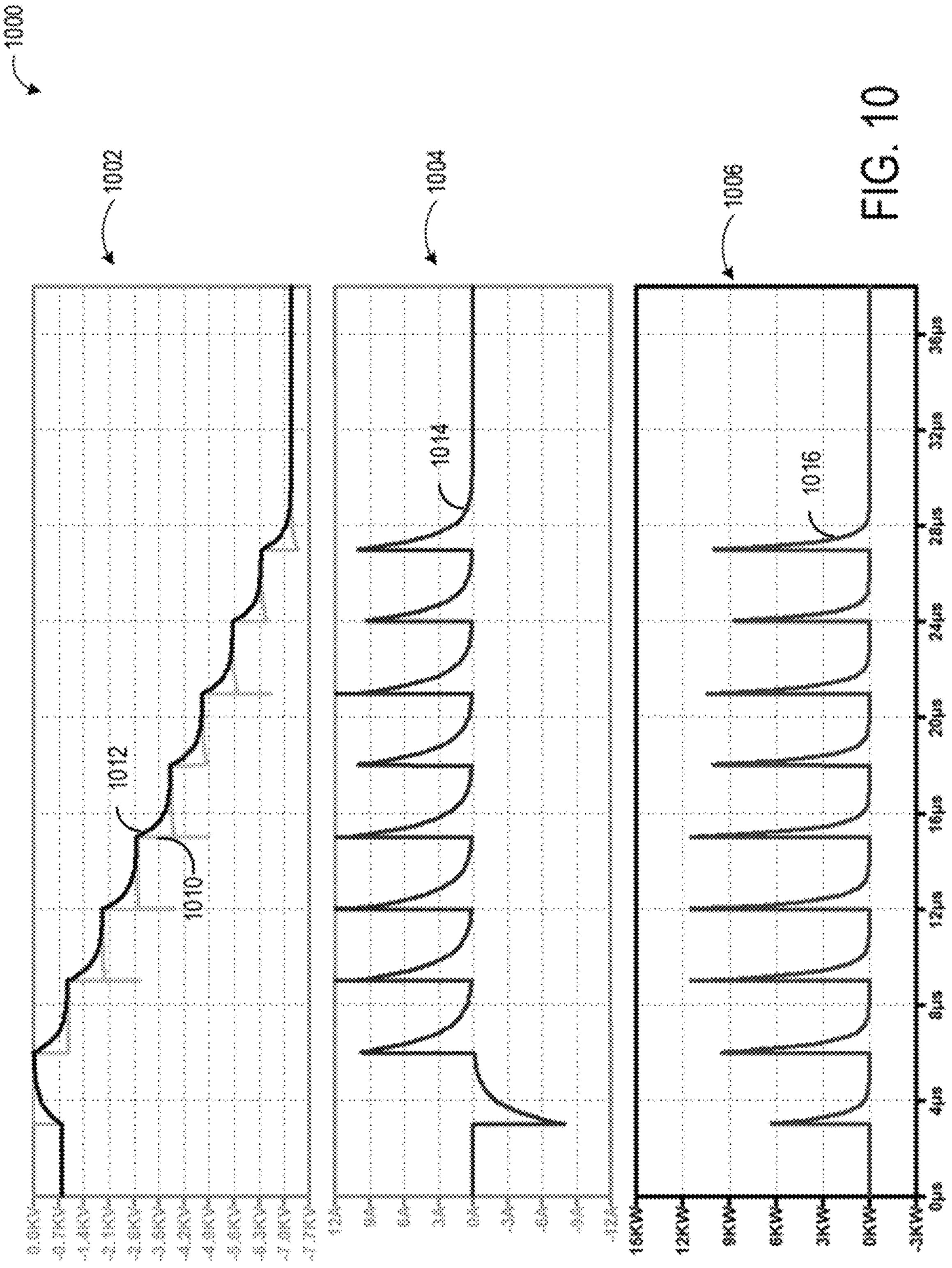
FIG. 10 shows a first diagram showing output losses at a resistor of a control circuit, in accordance with one or more embodiments of the present disclosure.

Referring briefly to FIG. 10, a first output loss diagram 1000 is shown, corresponding to a first embodiment of the first control circuit 502 not including the inductor 534. First output loss diagram 1000 includes a first output voltage graph 1002, where first output voltage graph 1002 includes a first ladder output voltage plot 1010, and a first circuit output voltage plot 1012. First ladder output voltage plot 1010 shows a commanded voltage applied to gridding electrode 550 over time during a transition from the bias voltage to the gridding voltage, and first circuit output voltage plot 1012 shows an actual electrode voltage generated at the gridding electrode 550 over the transition as a result of the commanded voltage. First output loss diagram 1000 also includes a first output current graph 1004 showing a first output current plot 1014 of an output current generated at the gridding electrode 550 as a result of the first circuit output voltage shown by plot 1012, and a first output resistor loss graph 1006 showing a first output resistor loss plot 1016 indicating a loss of energy over time at the resistor 532 based on the first output current plot 1014. As shown by the first output resistor loss plot 1016, output resistor losses may approach 12 kWpeak.

Figure 11:
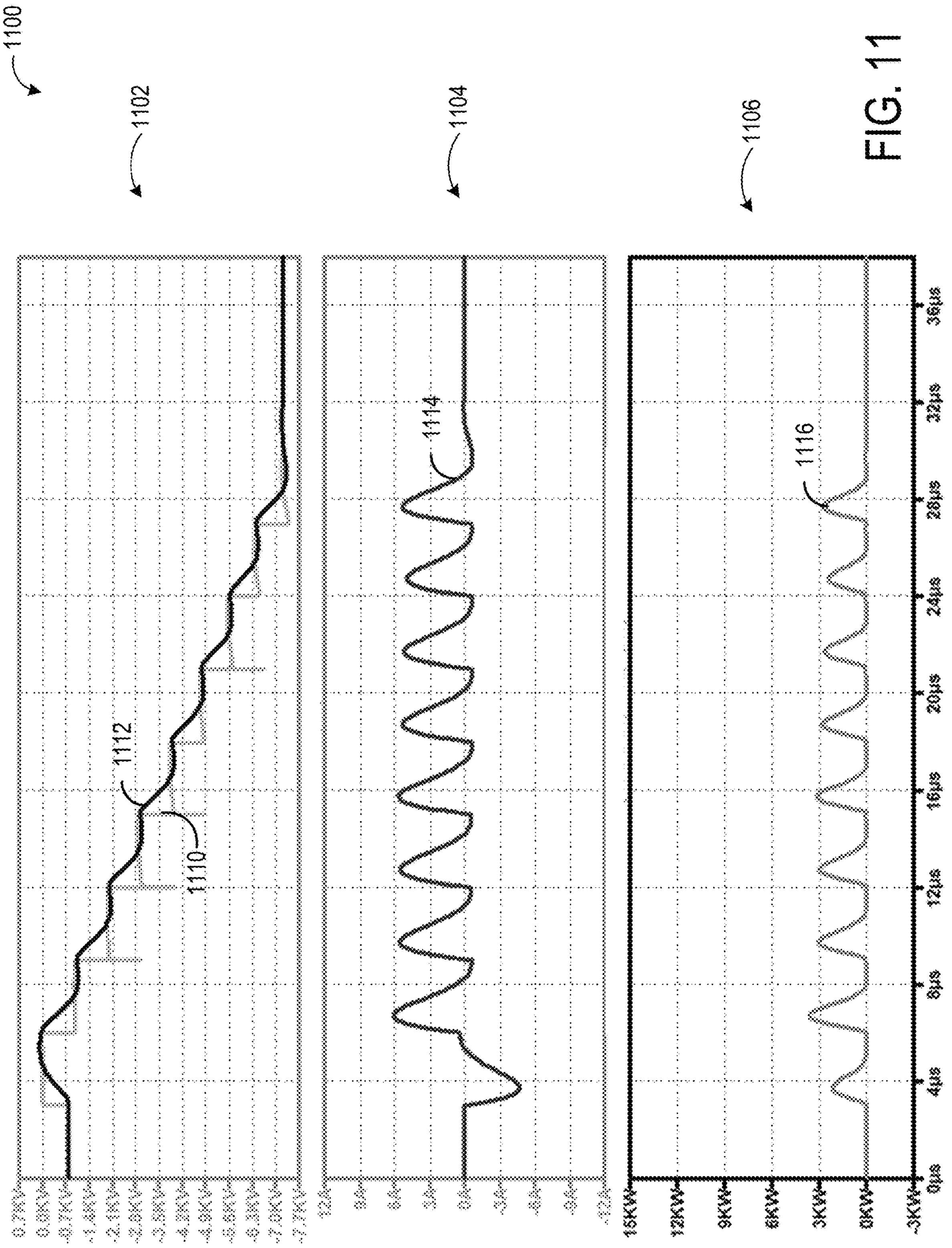
FIG. 11 shows a second diagram showing output losses at a resistor of a control circuit, in accordance with one or more embodiments of the present disclosure.

In contrast, FIG. 11 shows a second output loss diagram 1100, corresponding to a second embodiment of the first control circuit 502 including the inductor 534. Second output loss diagram 1100 includes a second output voltage graph 1102, where second output voltage graph 1102 includes a second ladder output voltage plot 1110, and a second circuit output voltage plot 1112. Second ladder output voltage plot 1110 shows a commanded voltage applied to gridding electrode 550 over time during a transition from the bias voltage to the gridding voltage, and second circuit output voltage plot 1112 shows an actual electrode voltage generated at the gridding electrode 550 over the transition as a result of the commanded voltage. Second output loss diagram 1100 also includes a second output current graph 1104 showing a second output current plot 1114 of an output current generated at the gridding electrode 550 as a result of the second circuit output voltage shown by plot 1112, and a second output resistor loss graph 1106 showing a second output resistor loss plot 1116 indicating a loss of energy over time at the resistor 532 based on the second output current plot 1114. In comparison with the first output current plot 1014 of FIG. 10, the second output current plot 1114 shows an output current with a reduced amplitude when the inductor 534 is added to the first control circuit 502, which may reduce constraints on components of switching unit 500 during transitions. As a result, the output resistor losses indicated by the second output resistor loss plot 1116 (when the inductor 534 is included in the first control circuit 502) are lower than the output resistor losses indicated by the first output resistor loss plot 1016 of FIG. 10 (e.g., approximately 3 kWpeak as opposed to 12 kWpeak, when the inductor 534 is not included in the first control circuit 502).

Returning to FIG. 5, in various embodiments, the second control circuit 504 that controls the bias voltage includes a high precision voltage source 570, a capacitor 571 (e.g., capacitor 321) and various switches, such as switches 562-563. Voltage source 570 may be a variable, high precision voltage source capable of supplying between 0 and −1200V via capacitor 571 with a high degree of precision (e.g., +/−50V). A simplified bidirectional flyback may be used for the voltage source 570. The second control circuit 504 may generate the bias voltage (or not) by switching either or both of the switches 562 and 563 from a closed position to an open position, or vice versa. The stages of the first control circuit 502 have no impact on an output voltage of the high precision voltage source 570, which can be independently connected to an output or bypassed. In other words, in a first, grid mode, the stages 510-517 are connected, and the high precision voltage source 570 is bypassed, and in a second, bias mode, the stages 510-517 are bypassed, and the high precision voltage source 570 is connected. In this way, selecting which voltage is applied to the gridding electrode 550 is performed by driving selection switches 562, 563 and switches from stages 510 to 517. This hardware simplification is beneficial for a control strategy of multi-stage switching unit 500, which makes transitions from grid to bias and vice-versa very reproducible.

Figure 6:
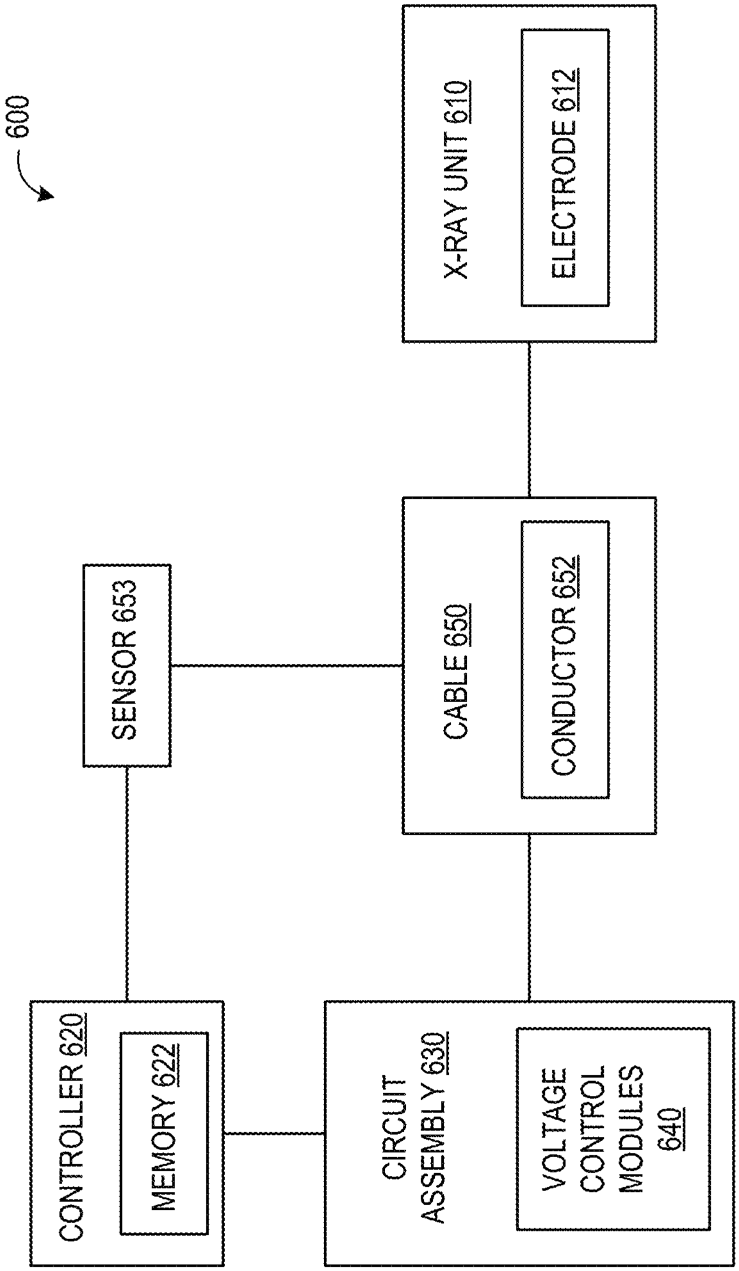
FIG. 6 is a schematic diagram of an interventional imaging system including a cable, in accordance with one or more embodiments.

FIG. 6 is a schematic depiction of an imaging system 600, in accordance with various embodiments. Imaging system 600 may include or be included in the interventional imaging systems described in relation to FIGS. 1 and 2. Imaging system 600 includes an X-ray unit 610 (e.g., X-ray tube assembly 50 of FIG. 1), a controller 620 (e.g., controller 66), a circuit assembly 630 (e.g., multi-stage switching unit 500 of FIG. 5) including a plurality of voltage control modules 640 (e.g., switching units 200 of FIG. 2), and a cable 650. Generally, the controller 620 is operably coupled to circuit assembly 630, and utilizes the voltage control modules 630 for providing a desired voltage (or voltages) to the X-ray unit 610 via the cable 650.

In the illustrated embodiment, the X-ray unit 610 includes an electrode 612. A voltage above the gridding voltage threshold provided to electrode 612 de-activates the X-ray unit 610 by stopping the electron beam. A secondary voltage (bias voltage) well below the gridding voltage provided to electrode 612 focuses or controls the dimension of the produced electron beam.

The controller 620 is configured to control various aspects of the system 100, including the provision of voltage to control the X-ray unit 610, for example by controlling the voltage control modules 640 of the circuit assembly 630. For example, based on a sensed voltage in the cable 650 measured with sensor 653, the controller 620 may adjust a voltage provided to the X-ray unit 610 by controlling switches of one or more fine tuning circuit portions of the voltage control modules 640 (e.g., the switches 522 and 524 of the stages 510-517). The controller 620 may include processing circuitry configured to perform one or more tasks, functions, or steps discussed herein. It may be noted that "controller" as used herein is not intended to necessarily be limited to a single processor or computer. For example, the controller 620 may include multiple processors and/or computers, which may be integrated in a common housing or unit, or which may distributed among various units or housings. The circuit assembly 630 may be generally similar in various respects to the multi-stage switching unit 500 discussed herein.

In the illustrated embodiment, the controller 620 includes a memory 622 which includes a tangible and non-transitory computer readable medium. It may be noted that the memory 622 may have stored thereon instructions for directing the controller 620 to perform one or more aspects of the methods, steps, or processes discussed herein. In various embodiments, the controller 620 may control individual voltage control modules and/or a group or groups of voltage control modules simultaneously to control the total delivered voltage. For example, the controller 620 may actuate switching portions of all or most of the modules to provide a large voltage change to turn an electrode on and off, and may control one or more of the modules for fine tuning of voltage to focus an electron beam.

The cable 650 operably connects the circuit assembly 630 and the X-ray unit 610. For example, a conductor 652 of the cable 650 may be operably coupled to a group of voltage control modules and to the electrode 612. Voltage provided via the conductor 652 may be utilized to turn the X-ray unit 610 on and off and/or to control focus of the electron beam. The provided voltage may include a gridding voltage and/or a bias voltage applied to electrode 612 (e.g., the electrode 550 in FIG. 5), which may be generated by a first control circuit (e.g., first control circuit 502) and a second control circuit (e.g., second control circuit 504), respectively. In other words, the generation of the gridding voltage and the bias voltage may be separated, as described above in reference to FIG. 5.

In various embodiments, redundancy may be provided for improved reliability. For example, in some embodiments, a plurality of low voltage circuit portions may be utilized, with each low voltage circuit portion coupled to a group of voltage control modules and configured to control a voltage provided to the corresponding group of voltage control modules from a given low voltage circuit portion. Alternatively or additionally, a plurality of transformers may be utilized, with each transformer operably coupled to at least one corresponding voltage control module. In some embodiments, a given transformer and a corresponding low voltage circuit portion may be coupled to a corresponding low voltage circuit portion.

Figure 7:
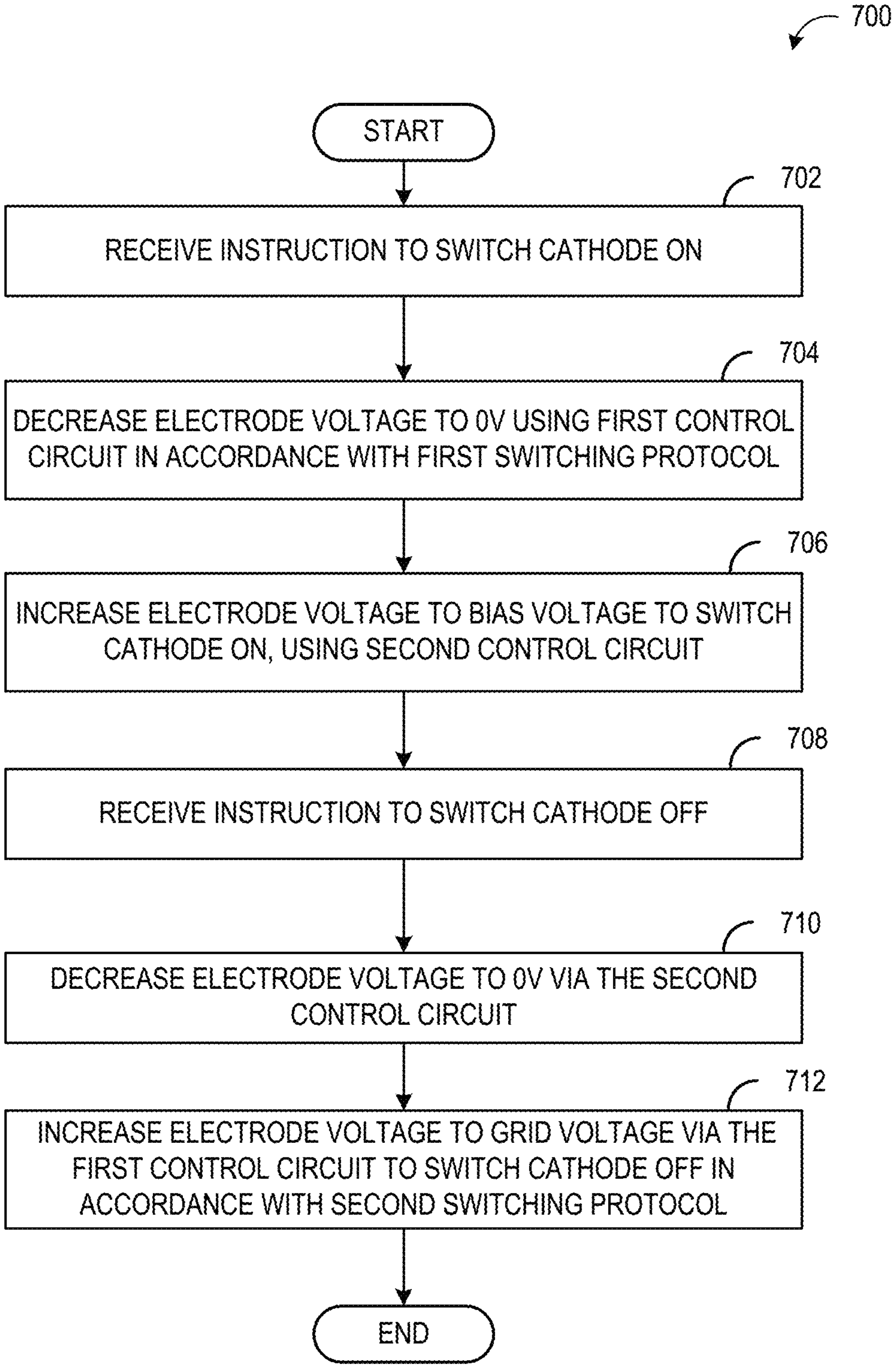
FIG. 7 is a flowchart showing an exemplary method for controlling the second multi-stage topology of FIG. 5.

FIG. 7 shows a method 700 for controlling a circuit with a multi-stage architecture, such as multi-stage switching unit 500 of FIG. 5, to power a unipolar cathode of an X-ray tube of an interventional imaging system, such as the interventional imaging systems referred to in FIGS. 6, 10 and 11 herein. The unipolar cathode may be used in modern interventional imaging systems that can be gridded off with a voltage greater than a threshold negative voltage, for example, −8 kV, and that rely on a precise controllable bias voltage between a common voltage (e.g., a reference voltage for the circuit, which for simplicity is considered to be 0V herein), and −1.2 kV with a precision of +/−50V to turn on and control the electron beam shape. In other words, the bias voltage and the gridding voltage are expressed with respect to the common voltage. It should be appreciated that technically speaking, the common voltage may be a high voltage, for example, up to 125 kV. Thus, while the common voltage is referred to herein as 0V, the common voltage in absolute terms may be −125 kV, and the gridding voltage of −8 kV may be an absolute voltage of −133 kV.

Such systems may include constraints for a maximum transition time from on-to-off and vice-versa of less than 50 μs, which may not be met by other alternative circuit control architectures. Method 700 may be executed by a controller or processor of the interventional imaging system, based on instructions stored in a memory of the interventional imaging system.

In contrast to the alternative circuit control architectures, the multi-stage circuit of method 700 separates a first grid function and a second bias function, as described above in reference to FIG. 5, to operate electronics of the circuit such that a cathode turn-on is accomplished in two steps: from off voltage (e.g. −8 kV) to the common voltage, then from the common voltage to the desired bias voltage (e.g., −1.2 kV). Equivalently, a cathode turn-off will also be accomplished in two steps: from the bias voltage (e.g. −1.2 kV) to the common voltage, then from the common voltage to the off (gridding) voltage (e.g. −8 kV).

Method 700 begins at 702, where method 700 includes receiving a first instruction to switch the unipolar cathode of the interventional imaging system on. In various embodiments, the first instruction may be an instruction to initiate an X-ray pulse generated by a protocol selected by an operator of the interventional imaging system.

At 704, method 700 includes decreasing an electrode voltage supplied to the gridding electrode 550 by one or more −1 kV first voltage sources of the interventional imaging system to the common voltage. It should be appreciated that as the voltages supplied to the gridding electrode 550 are negative voltages, for the purposes of this disclosure, decreasing the electrode voltage refers to decreasing an absolute value of the electrode voltage (e.g., decreasing the electrode voltage in a negative direction), and increasing the electrode voltage refers to increasing the absolute value of the electrode voltage (e.g., increasing the electrode voltage in the negative direction). The first voltage sources may be non-limiting examples of the voltage sources 520 of the stages 510-517 of the first control circuit 502 of the multi-stage switching unit 500 of FIG. 5, where the gridding voltage is achieved by combining a plurality of stage voltages generated by each of the stages 510-517, as described above. While the electrode voltage is decreased by sequentially bypassing the first voltage sources, a second voltage source of a second control circuit (e.g., high precision voltage source 570 of second control circuit 504) may be maintained off, such that no voltage is generated by the second control circuit. For example, the second voltage source may be switched off by actuating switches 562-563 into a bypass position.

Decreasing the electrode voltage supplied to the gridding electrode 550 by one or more voltage sources to the common voltage may include switching each of the first voltage sources off in a series of steps, thereby reducing the electrode voltage by 1 kV at each step as a corresponding stage is bypassed, until all of the voltage sources are switched off and the voltage supplied to the gridding electrode 550 is the common voltage. Each of the voltage sources may be switched off by either opening or closing switches 522 and 524 of each of the stages 510-517, as described above in reference to FIG. 4. The switching off of the voltage sources is described in greater detail below in reference to FIGS. 8 and 9.

In one approach, the first voltage sources may be switched off and the stages bypassed by following a basic protocol where the stages are bypassed sequentially in a consecutive fashion, from stage 510-517. For example, a first voltage source 520 of the first stage 510 may be switched off first; a second voltage source 520 of the second stage 511 may be switched off second; a third voltage source 520 of the third stage 511 may be switched off third; and so on until an eighth voltage source 520 of the eighth stage 517 is switched off. However, if the stages are bypassed sequentially in the consecutive fashion, a voltage imbalance may occur between capacitors 521 of the stages 510-517, due to a higher capacitance of the longer cable described in reference to FIG. 6. The voltage imbalance may result in premature aging and potentially a failure of components of the stages, including the switches 522 and 524.

To reduce the voltage imbalance, the stages 510-517 may be bypassed in accordance with an alternative control strategy that specifies a first non-consecutive order for switching off the first voltage sources. The first non-consecutive order may be specified in a first optimized protocol that establishes an sequence for disengaging the stages 510-517 such that the voltage imbalance is minimized. At each step of the sequence, one or more stages may be selectively bypassed or engaged. For example, at a first step of the optimized protocol, the first stage 510 may be bypassed (e.g., the voltage source 520 of the first stage 510 may be switched off); at a second step, the fourth stage 513 may be bypassed; at a third step, the fifth and sixth stages 514 and 515 may be bypassed and the fourth stage 513 may be engaged; at a fourth step, the seventh and eighth stages 516 and 517 may be bypassed and the fifth stage 514 may be engaged; and so on, until all of the stages 510-517 are bypassed. By selectively disengaging and engaging the stages in the non-consecutive order, the voltages generated at the capacitors 521 of the stages 510-517 may be partially or totally equalized, such that the voltage imbalance is prevented. As a result, the potential damage to the components may be prevented or avoided. The alternative control strategy is described in greater detail below in relation to FIGS. 12-16.

At 706, method 700 includes increasing the electrode voltage supplied to the gridding electrode 550 from the common voltage to the bias voltage (e.g., −1.2 kV with a precision of +/−50V). Increasing the electrode voltage supplied to the gridding electrode 550 from the common voltage to the bias voltage may include maintaining the voltage sources of stages 510-517 off. Concurrently, the bias voltage may be generated by the second control circuit 504, which may be connected to the gridding electrode 550 by opening switch 563 and closing switch 562. When the bias voltage is achieved, the cathode may be switched on, whereby X-rays may be generated by the cathode and the X-ray may be performed.

At 708, method 700 includes receiving a second instruction to switch the unipolar cathode off (e.g., to stop the X-ray). The second instruction may be generated by the X-ray exposure protocol, or in a different manner.

At 710, method 700 includes decreasing the electrode voltage from the bias voltage to the common voltage. Decreasing the electrode voltage to the common voltage may be accomplished by opening switch 562 and closing switch 563 of the second control circuit, so that no bias voltage generated by the second voltage source is applied to the cathode (e.g., to the gridding electrode 550). Decreasing the electrode voltage to the common voltage from the bias voltage via the second control circuit can be performed quickly and without precision.

At 712, method 700 includes increasing the electrode voltage from the common voltage to the gridding voltage, to switch the unipolar cathode off, thereby ending the X-ray. Increasing the electrode voltage to the common voltage may be accomplished as described above in reference to steps 704 and/or 706, but where individual voltage sources of various stages of the multi-stage circuit are sequentially switched on. In particular, a second optimized protocol may be used to sequentially engage the stages 510-517 in a second, non-consecutive order similar to the first non-consecutive order described above at step 704, to avoid a voltage imbalance generated by the cable capacitance. In various embodiments, the second non-consecutive order may be a reverse order of the first non-consecutive order. For example, at a first step of the optimized protocol, the eighth stage 517 may be engaged (e.g., the voltage source 520 of the eighth stage 517 may be switched on); at a second step, the sixth stage 515 and seventh stage 516 may be engaged, and the eighth stage 517 may be bypassed; at a third step, the seventh stage 516 may be bypassed and the fourth stage 513 and the fifth stage 514 may be engaged; and so on, until all of the stages 510-517 are engaged. By selectively disengaging and engaging the stages in the non-consecutive order, the voltages generated at the capacitors 521 of the stages 510-517 may be partially or totally equalized, such that the voltage imbalance is prevented. As a result, the potential damage to the components may be prevented or avoided.

In some embodiments, the second non-consecutive order may be established in a matrix used by a controller of the interventional imaging system to execute the second optimized protocol, such as the stage engagement matrix described below in reference to FIG. 16. Similarly, the first non-consecutive order may be established in a matrix used by a controller of the interventional imaging system to execute the first optimized protocol.

Thus, the electrode voltage applied to the gridding electrode 550 to start the X-ray exposure may be generated by the second control circuit, and the electrode voltage applied to the gridding electrode 550 to end the X-ray exposure may be generated by the first control circuit. The split of these two functions allows for a decrease in voltage when precision is not required (grid), while allowing suitable voltage precision in a short period of time when the bias voltage is applied to the gridding electrode 550. One advantage of splitting the two functions is that the bias voltage generated by the second voltage source 570 of second control circuit 504 may be unaffected by a temporary decrease in voltage at the gridding electrode 550 of the cathode due to parasitic capacitance associated with long cables (e.g., cable 650 of FIG. 6) when the interventional system is switched from the gridding voltage to the bias voltage. During the transition from the common voltage to bias voltage (e.g. −1.2 kV), the temporary voltage decrease may be minimal, as it is proportional to a magnitude of the relatively small voltage change, and may be easily absorbed in an allowed maximum transition duration and precision specified by the interventional imaging system. Similarly, during cathode turn-off, the electrode voltage is switched to the common voltage (thereby avoiding the temporary voltage drop), and then switched to the gridding voltage value.

Figure 8:
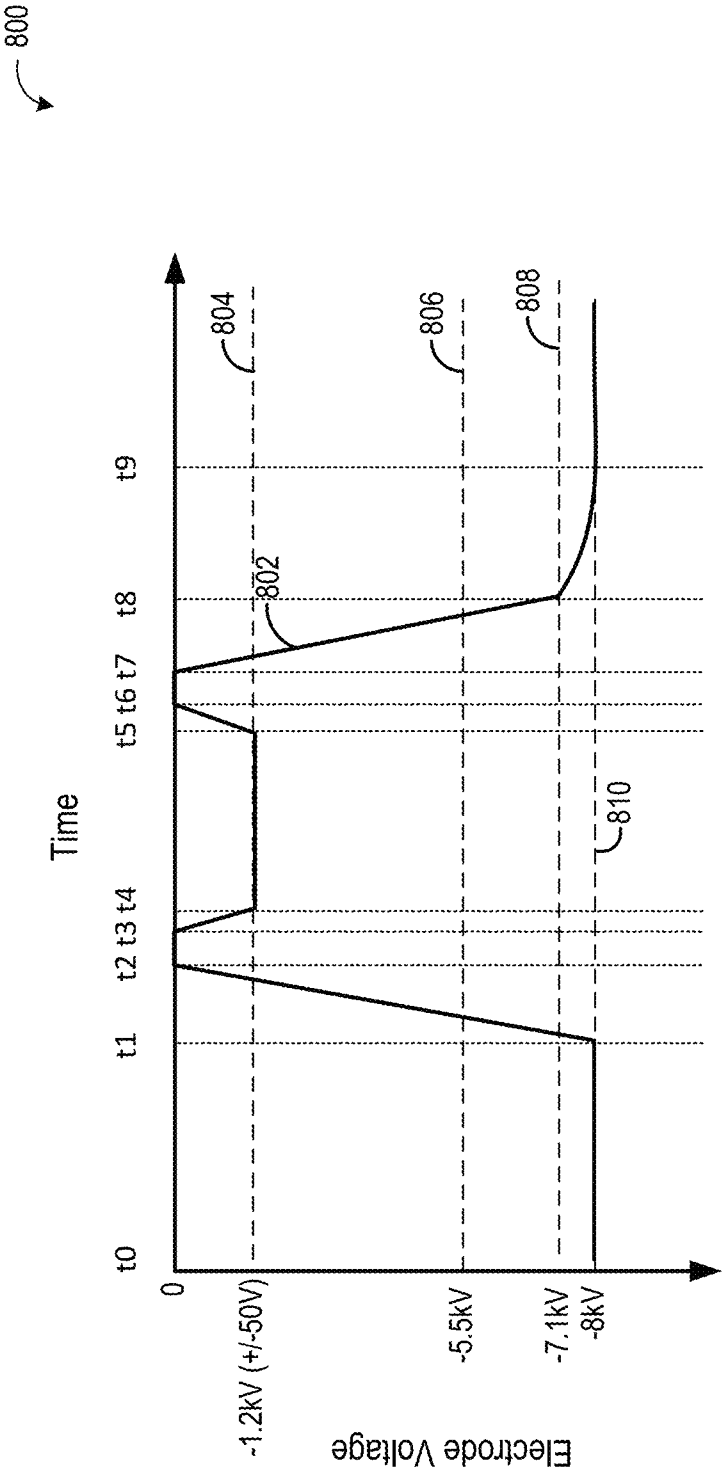
FIG. 8 is a first timing diagram showing a graph of a change in voltage over time while controlling the second multi-stage topology of FIG. 5 in accordance with the method of FIG. 7.

During this last step switching from the common voltage to −8 kV, the temporary voltage decrease may be evident when the electrode voltage achieves −7.1 kV, after which the electrode voltage may increase more slowly to −8 kV, as shown in FIG. 8. As long as the electrode voltage reached immediately after the switch occurs (−7.1 kV) is lower than a turn off gating value of the cathode imposed by the interventional X-ray tube (e.g., −7 kV), the temporary voltage decrease may have little effect on the operation of the cathode. The temporary voltage decrease may then gradually disappear within few milliseconds, allowing the cathode to reach the commanded steady state value at the gridding voltage (e.g. −8 kV).

Referring now to FIG. 8, an exemplary timing diagram 800 shows a transition in a electrode voltage generated by a circuit with the multi-stage architecture of multi-stage switching unit 500 of FIG. 5 over time, in accordance with method 700 of FIG. 7. Time is shown on a horizontal axis of timing diagram 800, and the electrode voltage is shown on the vertical axis.

Timing diagram 800 shows a plot 802, which illustrates an amount of electrode voltage generated by the circuit over time as the circuit transitions from a first voltage at which a unipolar cathode of an interventional imaging system is switched off (e.g., does not generate X-rays and does not expose a patient of the interventional imaging system to radiation), to a second, bias voltage at which the cathode is switched on (e.g., generating X-rays and exposing the patient to the radiation). Time points of interest during the transition are illustrated by vertical dotted lines. In the depicted embodiment, the second, bias voltage at which the cathode is switched on is −1.2 kV with a precision of +/−50V, indicated by a dashed line 804. A dashed line 806 indicates a threshold voltage of −5.5 kV at which an electron beam may not be generated by the cathode. Newer interventional imaging systems may be gridded off with a voltage of −8 kV or less, as indicated by a dashed line 808. In the depicted embodiment, the first voltage at which the cathode is gridded off is −8 kV, as indicated by a dashed line 810.

At a time t0, the cathode is gridded off. At a time t1, a X-ray exposure may be initiated via the interventional imaging system. For example, the X-ray exposure may be initiated in accordance with a protocol executed by the interventional imaging system based on input from an operator of the interventional imaging system. When the X-ray exposure is initiated, between the time t1 and a time t2, instructions are supplied to a controller of the interventional imaging system, that when executed, actuate one or more switches of the multi-stage circuit to decrease the electrode voltage (in a negative direction) to a common voltage of the interventional imaging system, as indicated by plot 802. In the depicted embodiment, the common voltage is considered to be 0V.

Between the time t2 and a time t3, the electrode voltage remains at the common voltage (e.g., 0V). For example, the time between time t2 and time t3 may be less than 2.5 μs. In general, a time of 3.0 μs may be a threshold duration imposed by the interventional imaging system for stabilizing the electrode voltage delivered to the gridding electrode 550 at each step of a transition between voltages. A set of exemplary steps of a transition are described below in reference to FIG. 9. At the time t3, instructions are supplied to the controller that when executed, actuate the one or more switches of the multi-stage circuit to increase the electrode voltage. Between the time t3 and a time t4, the electrode voltage is increased (in the negative direction) from the common voltage to the second, bias voltage of approximately −1.2 kV.

At the time t4, the cathode is supplied with the bias voltage, and the cathode is switched on, whereby X-rays are generated by the interventional imaging system and the X-ray exposure is performed. The X-ray exposure is performed from the time t4 to a time t5. At the time t5, the X-ray exposure stops, for example, in accordance with the protocol. When the X-ray exposure stops, instructions are supplied to the controller, that when executed, actuate the one or more switches of the multi-stage circuit to decrease the electrode voltage (in the negative direction) back to the common voltage. At a time t6, the electrode voltage reaches the common voltage, where it remains from the time t6 until a time t7.

At the time t7, instructions are supplied to the controller, that when executed, actuate the one or more switches of the multi-stage circuit to increase the electrode voltage (in the negative direction) back to first voltage. Between the time t7 and a time t8, the electrode voltage increases (in the negative direction).

At the time t8, the electrode voltage has increased to −7.1 kV, achieving the threshold voltage relied on by the newer interventional imaging systems for gridding off. As a result, by time t8, the interventional imaging system is no longer generating X-rays, having past the threshold for generating the electron beam indicated by dashed line 806, and the patient is not exposed to the radiation. Between the time t8 and a time t9, due to the temporary voltage decrease due to the cable length described above, the electrode voltage slowly increases (in the negative direction) to achieve the first voltage, at which in this embodiment the cathode is gridded off.

Thus, under the proposed method for controlling the voltage transition between the first gridding voltage to the second bias voltage (and vice-versa), using the multi-stage circuit architecture described in reference to FIG. 5, the electrode voltage may be controlled over the transition in a manner that may decrease a time of the transition while increasing a precision of the transition. Current methods that decrease the electrode voltage from the first gridding voltage to the second bias voltage may take a first, longer amount of time, because of a size of a difference between the first gridding voltage and the second bias voltage and a precision relied on for achieving the bias voltage. In contrast, the proposed method performs the transition in a second, shorter amount of time by splitting the transition into two separate steps.

When switching the cathode on, in a first step, the electrode voltage is decreased to the common voltage (e.g., between the time t1 and the time t2) in a first transition, and in a second step, the electrode voltage is increased to the bias voltage (e.g., between the time t3 and t4) in a second transition. The first step and the second step can be performed more rapidly than decreasing the electrode voltage directly to a precise, different (e.g., non-zero) voltage, because the first transition generated by the second control circuit 504 (e.g., a bias circuit) is independent from the second transition generated by the first control circuit 502 (e.g., a gridding circuit). As a result, the high precision voltage source 570 of the second control circuit 504 may be less perturbed, and may recover the bias voltage rapidly and with a desired precision (e.g., less of 100 μs).

Similarly, when the unipolar cathode is switched off, a second transition from the second bias voltage to the first gridding voltage (e.g., time t5 to t9) may be performed in two steps, a first step where the electrode voltage is decreased to the common voltage (by connecting to the common voltage, where precise control of the voltage transition is not an issue), and a second step where the electrode voltage is increased to the first gridding voltage. During the second step, the voltage transition from the common voltage to the threshold voltage for gridding off the cathode (e.g., time t7 to t8) may be performed quickly (e.g., in less than 50 μs) and with less precision, since once the cathode is no longer generating X-rays, achieving the first gridding voltage may be accomplished over a longer period of time, as indicated by plot 802 between time t8 and t9. For example, the longer period of time may be as much as 5 ms.

Figure 9:
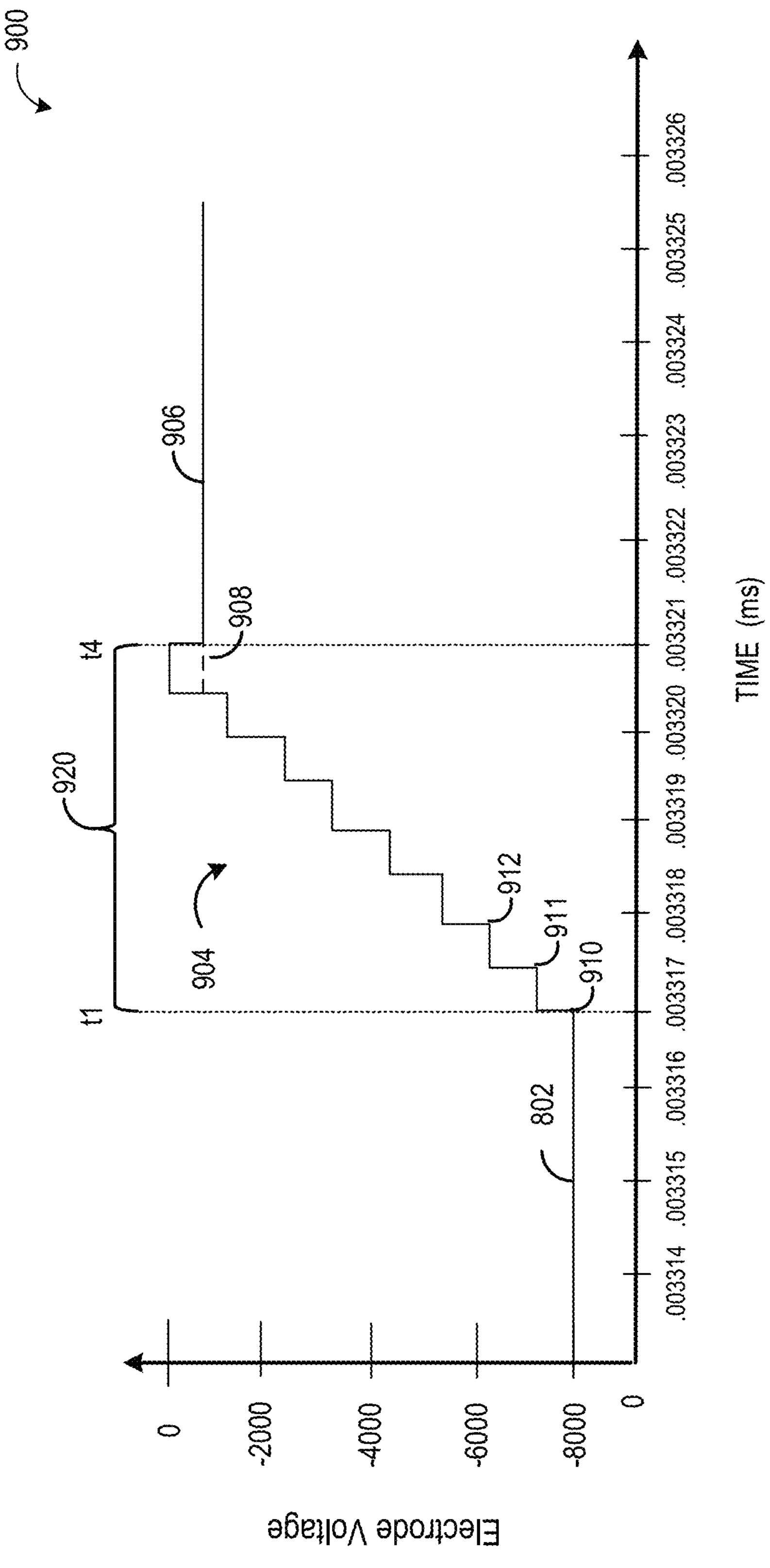
FIG. 9 shows an exploded view of a portion of FIG. 8.

FIG. 9 shows an exploded view 900 of a portion of timing diagram 800, including plot 802. In particular, a portion of plot 802 between time t1 and time t4 is shown, where the electrode voltage is decreased (in the negative direction) from the first gridding voltage (e.g., −8 kV) to the common voltage (e.g., 0V) and then increased to the second, bias voltage (e.g., −1.2 kV, with the precision of +/−50V). Exploded view 900 shows the electrode voltage decreasing over a series of steps 904. Each of the steps 904 may correspond to a change in the electrode voltage produced by opening or closing a switch of the multi-stage circuit (e.g., multi-stage switching unit 500 of FIG. 5). That is, the first gridding voltage may be produced by a first configuration of switches 522 and 524 of each of stages 510-517, where the first configuration generates a maximum amount of voltage of the multi-stage circuit (e.g., −8 kV). At a time 910, one or both switches of first stage 510 are opened or closed to switch off a 1 kV voltage source 520 of first stage 510, thereby decreasing the amount of negative voltage to −7 kV. At a time 911, one or both switches of second stage 511 are opened or closed to switch off a corresponding 1 kV voltage source 520, thereby decreasing the amount of negative voltage to −6 kV. At a time 912, one or both switches of third stage 512 are opened or closed to switch off a corresponding 1 kV voltage source 520, thereby decreasing the amount of negative voltage to −5 kV, and so on, until the time t4, when all of the 1 kV voltage sources 520 of all of stages 510-517 are switched off, and the electrode voltage is the common voltage.

Then, at the time t4, the bias voltage shown by line 906 may be generated by the second control circuit 504 of multi-stage switching unit 500. For example, switches 562-563 of multi-stage switching unit 500 may be actuated to generate the bias voltage via the second high precision voltage source 570. In this way, the transition from the first gridding voltage to the bias voltage is advantageously performed in two steps by two different circuits of the multi-stage circuit. A first total time 920 taken by the multi-stage circuit to achieve the bias voltage is the time between time t1 and time t4.

In contrast, a second, dashed line 908 shows an alternative transition from the first gridding voltage directly to the bias voltage using the multi-stage circuit with the architecture disclosed herein. This alternative transition, even if it has some advantages, is less repeatable (more dependent on circuit (components tolerance) and environment (cable length) variability) and includes simultaneous transitions of the flyback stage and of the 1 kV stages (involving additional perturbation on bias voltage and needing more complex control). A second alternative transition from the first gridding voltage directly to the bias voltage (without transitioning through the common voltage) may be performed using an alternative circuit with a different architecture and without using the multi-stage circuit with the architecture disclosed herein, but with higher constraints on the electronic components.

Figure 12:
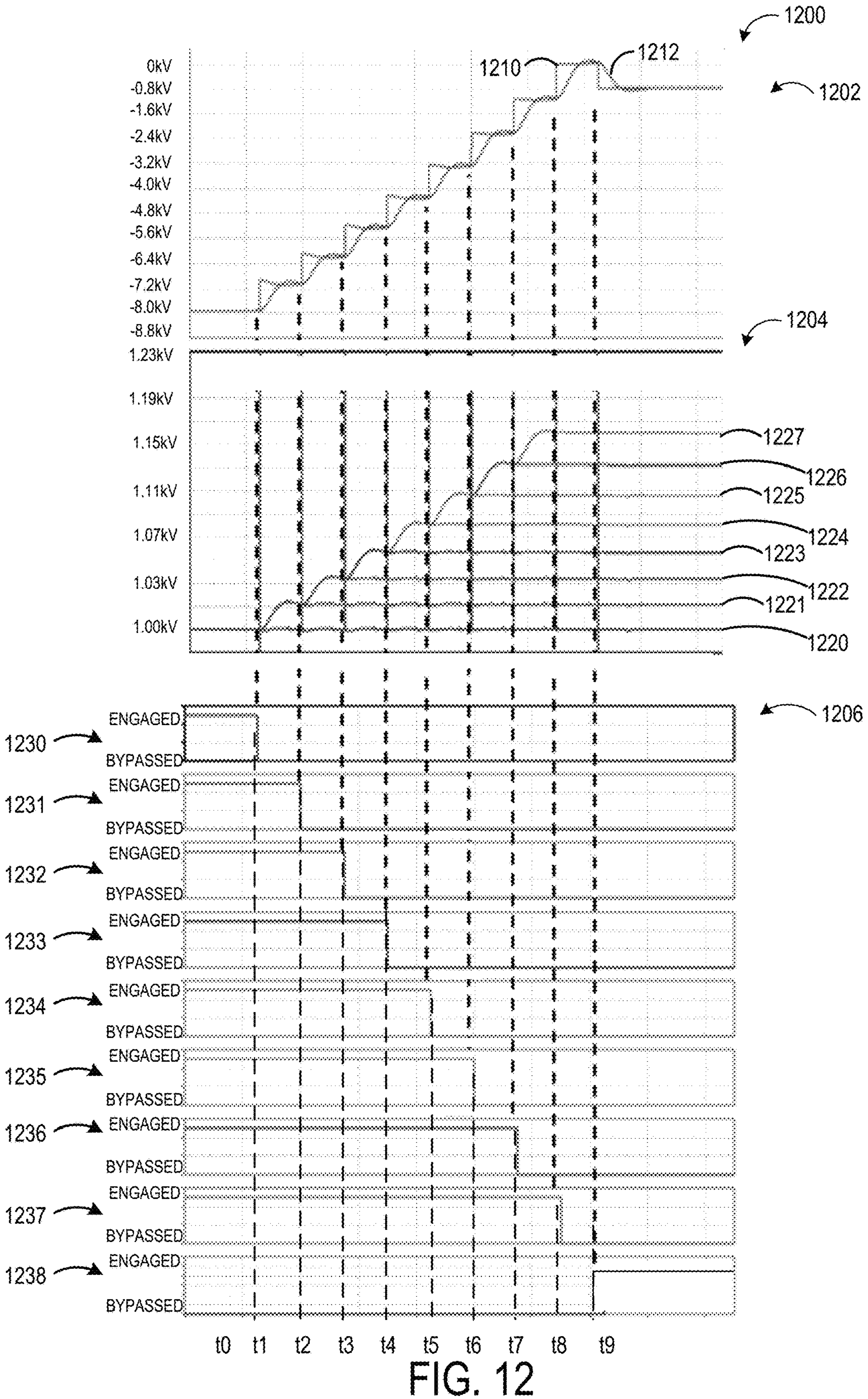
FIG. 12 is a second timing diagram showing a sequence of events during a first transition of the interventional imaging system from a gridding voltage to a bias voltage with a basic protocol.

Referring now to FIG. 12, a second exemplary timing diagram 1200 shows a first transition in a voltage generated by the first control circuit 502 of FIG. 5, from a first, gridding voltage at which a unipolar cathode of the interventional imaging system is switched off, to a second, bias voltage at which the cathode is switched on, where the alternative switching control strategy described above in reference to FIG. 7 is not used. During the first transition, stages 510-517 of the first control circuit 502 are first switched off sequentially in a consecutive order, and then the high precision voltage source stage of the second control circuit 504 is switched on. Timing diagram 1200 includes three portions, which share a common horizontal axis showing time, where time points of interest during the transition are illustrated by vertical dashed lines. The first transition has two parts, including a first part from a time t1 to a time t8 during which a first voltage generated by the first control circuit 502 is reduced and no voltage is generated by the second control circuit 504, and a second part from time t8 to a time t9 when no voltage is generated by the first control circuit 502, and the second, bias voltage is generated by the second control circuit 504. In various embodiments, times t0-t9 occur at regular intervals with an equal duration. For example, the equal duration may be 3 μs for each step (depending on transition duration requirement and load (e.g., cable between electronics and tube)). It should be appreciated that for the purposes of FIGS. 12-15, a decrease in voltage refers to a decrease in an absolute value of the voltage, and an increase in voltage refers to an increase in the absolute value of the voltage.

A first portion 1202 shows a change in a combined voltage generated by the voltage sources (e.g., voltages sources 520 and/or voltage source 570) of the switching unit 500 over the transition. First portion 1202 includes a first plot 1210 indicating a ladder output voltage, meaning, a commanded voltage generated by switching unit 500 at different points in time, and a second plot 1212, indicating a circuit output voltage, meaning, an actual voltage generated at a cathode of the interventional imaging system (e.g., at bias/grid electrode 550) at the different points in time as a result of the commanded voltage. A vertical axis of first portion 1202 shows voltage.

A second portion 1204 shows a change in voltage generated at a capacitor (e.g., capacitor 521) of each stage of the first control circuit 502 over time during the first transition. A first plot 1220 shows a first charge generated at a first capacitor 521 of the first stage 510; a second plot 1221 shows a second charge generated at a second capacitor 521 of the second stage 511; a third plot 1222 shows a third charge generated at a third capacitor 521 of the third stage 512; and so on until an eighth plot 1227 shows an eighth charge generated at an eighth capacitor 521 of the eighth stage 517. A vertical axis of second portion 1204 shows voltage. A voltage contribution of the second control circuit 504 is not shown in second portion 1204.

A third portion 1206 indicates an engagement of each stage of switching unit 500 (including the high precision voltage source stage of the second control circuit 504 generating the bias voltage) during the transition towards the bias voltage. Each stage may be ENGAGED or BYPASSED. For example, a stage may be ENGAGED when a first configuration of switches of the stage (e.g., switches 522 and 524) connects the voltage source 520 of the stage to a circuit including the bias/grid electrode 550, whereby the voltage contribution to the electrode voltage is the (negative) output voltage of voltage source 520. The stage may be BYPASSED when a second configuration of the switches bypasses the voltage source, whereby the voltage contribution to electrode voltage is 0V.

Specifically, a first stage plot 1230 indicates whether the first stage 510 is ENGAGED; a second stage plot 1231 indicates whether the second stage 511 is ENGAGED; a third stage plot 1232 indicates whether the third stage 512 is ENGAGED; a fourth stage plot 1233 indicates whether the fourth stage 513 is ENGAGED; a fifth stage plot 1234 indicates whether the fifth stage 514 is ENGAGED; a sixth stage plot 1235 indicates whether the second stage 515 is ENGAGED; a seventh stage plot 1236 indicates whether the seventh stage 516 is ENGAGED; and an eighth stage plot 1237 indicates whether the eighth stage 517 is ENGAGED. A ninth stage plot 1238 indicates whether the high precision voltage source stage of second control circuit 504 is ENGAGED.

At a time t0, the cathode is gridded, and a maximum voltage of the interventional imaging system is applied (e.g., −8 kV), as indicated by plots 1210 and 1212 of first portion 1202. All stages are ENGAGED, as indicated by the third portion 1206. Between times t1 and t8, the stages of the first control circuit 502 are bypassed in a consecutive sequence, as indicated by plots 1230-1237 of third portion 1206. At time t1, the first stage indicated by plot 1220 is BYPASSED; at time t2, the second stage indicated by plot 1221 is BYPASSED; at time t3, the third stage indicated by plot 1222 is BYPASSED; and so on, until time t8 when all of the stages 510-517 of the first control circuit are BYPASSED. At the time t9, the high precision voltage source stage of the second control circuit 504 is ENGAGED, as indicated by plot 1238 of the third portion 1206. When the high precision voltage source stage is ENGAGED, the voltage generated by the switching unit 500 increases to the second, bias voltage, as shown by the plots 1210 and 1212 of the first portion 1202.

However, as is shown in second portion 1204, the sequential switching off of the stages generates an increasing voltage imbalance between the stages. If the operating sequence is consecutive (stage 510, then stage 511, then stage 512, up to stage 517), the first stage that is bypassed will remain at its initial voltage value whenever another stage is bypassed, and a last stage that is bypassed will suffer a voltage rise whenever another stage is bypassed, potentially leading to the failure of the board. As indicated in the second portion 1204, as the voltage sources of plots 1220-1227 are switched off in the consecutive sequence, a voltage at the capacitor 521 of each subsequent stage increases. As a result, a voltage generated at the eighth capacitor indicated by eighth plot 1227 may exceed a threshold voltage, where the eighth stage and/or other components of the switching unit 500 may be damaged.

Specifically, at time t1, the first stage 510 is BYPASSED, and plot 1220 shows that the voltage generated at the capacitor 521 of the first stage (but not applied to the cathode) remains at 1.00 kV. At time t2, the second stage 511 is BYPASSED, and plot 1221 shows that the voltage generated at the capacitor 521 of the second stage increases to 1.03 kV, due to the cable capacitance. At time t3, the third stage 512 is BYPASSED, and plot 1222 shows that the voltage generated at the capacitor 521 of the third stage increases to 1.07 kV. In this way, the voltage generated at each capacitor 521 of each of the stages 510-517 of the first control circuit increases incrementally as each stage is bypassed, until time t8, when plot 1227 shows that the voltage generated at the capacitor 521 of the last stage 517 increases above 1.15 kV, which may exceed a threshold voltage for the stage and cause damage to the stage. For example, one or both of switches 522 and 524 of the last stage 517 may be damaged.

A similar situation occurs during a second transition, when the cathode is switched off (e.g., after performing an X-ray exposure), as described in method 700 of FIG. 7. During the second transition, the high precision voltage source stage of the second control circuit 504 is switched off, decreasing the second, bias voltage generated by the switching unit 500 to the common voltage. If stages 510-517 of the first control circuit 502 are then engaged in a consecutive, ordered sequence to generate the first, gridding voltage, the voltage imbalance may also occur, as shown in FIG. 13.

Figure 13:
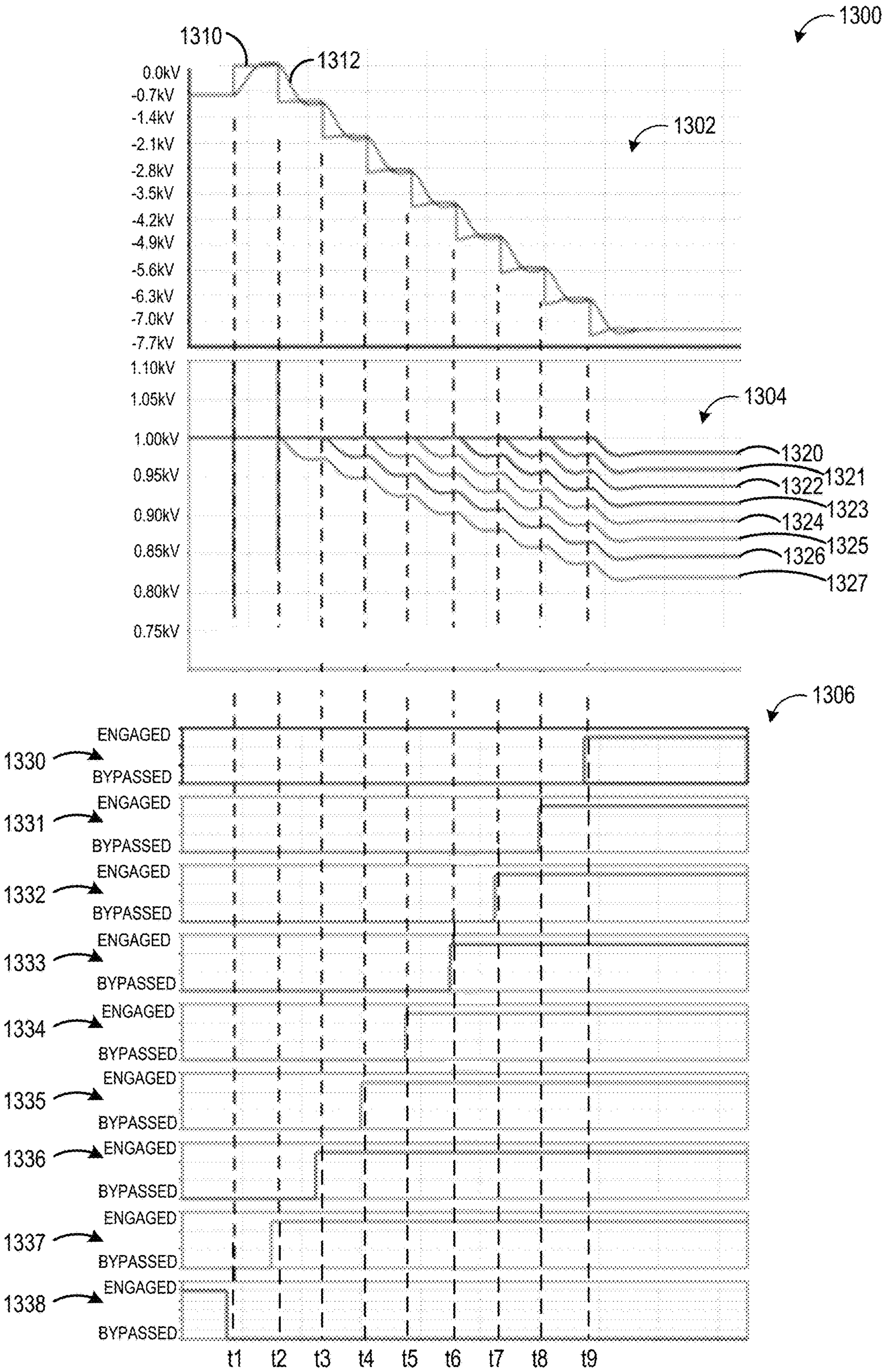
FIG. 13 is a third timing diagram showing a sequence of events during a second transition of the interventional imaging system from the bias voltage to the gridding voltage with a basic protocol, in accordance with one or more embodiments of the present disclosure.

FIG. 13 is a third exemplary timing diagram 1300 showing the second transition. Timing diagram 1300 includes three portions, which share a common horizontal axis showing time, where time points of interest during the second transition are illustrated by vertical dashed lines. The transition has two parts, including a first part from a time t1 to a time t2 during which the second, bias voltage generated by the second control circuit 504 is reduced to the common voltage and no voltage is generated by the first control circuit 502, and a second part from time t2 to a time t9 when no voltage is generated by the second control circuit 504 and the first, gridding voltage is generated by the first control circuit 502. As in FIG. 12, the times t0-t9 may occur at regular intervals.

A first portion 1302 shows a change in a combined voltage generated by the voltage sources (e.g., voltages sources 520 and/or voltage source 570) of the switching unit 500 over the second transition. First portion 1302 includes a first plot 1310 indicating a ladder output voltage, meaning, a commanded voltage generated by switching unit 500 at different points in time, and a second plot 1312, indicating a circuit output voltage, meaning, an actual voltage generated at the bias/grid electrode 550 at the different points in time as a result of the commanded voltage. A vertical axis of first portion 1302 shows voltage.

A second portion 1304 shows a change in voltage generated by the capacitor 521 of each stage of the first control circuit 502 over time during the second transition. A first plot 1320 shows a voltage generated at a first capacitor 521 of the first stage 510; a second plot 1321 shows a second voltage generated at a second capacitor 521 of the second stage 511; and so on up to an eighth plot 1327 showing an eighth voltage generated at an eighth capacitor 521 of the eighth stage 517. A vertical axis of second portion 1304 shows voltage. A voltage contribution of the second control circuit 504 is not shown in second portion 1304.

A third portion 1306 indicates an engagement of each stage of switching unit 500 (including the bias voltage generated by the high precision voltage source stage of the second control circuit 504) during the second transition. Each stage may be ENGAGED or BYPASSED. A first stage plot 1330 indicates whether the first stage 510 is ENGAGED; a second stage plot 1331 indicates whether the second stage 511 is ENGAGED; a third stage plot 1332 indicates whether the third stage 512 is ENGAGED; and so on until an eighth stage plot 1337 indicates whether the eighth stage 517 is ENGAGED. A ninth stage plot 1338 indicates whether the high precision voltage source stage of second control circuit 504 is ENGAGED.

At a time t0, the second, bias voltage is applied to the cathode by the second control circuit 504, and no voltage is applied by the first control circuit 502, as indicated by plots 1310 and 1312 of first portion 1302. All stages of the first control circuit 502 are BYPASSED, as indicated by plots 1330-1337, and the second control circuit 504 is ENGAGED, as indicated by the plot 1338. At time t1, the high precision voltage source 570 of the second control circuit 504 is switched off, and the voltage decreases to the common voltage (e.g., 0V) by time t2, as shown by plots 1310 and 1312. Between times t2 and t9, the stages 510 to 517 of the first control circuit 502 are ENGAGED in a consecutive sequence from stage 517 to stage 510, as indicated by plots 1330-1337 of third portion 1306. At the time t9, the voltage generated by the switching unit 500 approaches the first, gridding voltage, as shown by the plots 1310 and 1312 of the first portion 1302. A threshold voltage (e.g., indicated by dashed line 806 of FIG. 8) at which an electron beam is not be generated by the cathode is exceeded, the cathode is switched off, and no x-rays are generated.

However, as is shown in second portion 1304 and as seen in second portion 1204 of FIG. 12, the sequential switching on of the stages generates an increasing voltage imbalance. In this scenario, the first stage ENGAGED (which is the eighth stage 517) will suffered a voltage decrease every time a subsequent stage is ENGAGED, potentially leading to the failure of a component of the eighth stage 517. As shown in the second portion 1304, the voltage of the capacitor 521 of the eighth stage 517 indicated by plot 1327 decreases as subsequent stages are engaged in the consecutive sequence. At time t2, the voltage decreases from 1.00 kV to 0.95 kV as a result of the second stage being switched on; at time t3, the voltage decreases from 0.95 kV to 0.90 kV as a result of the third stage being switched on; and so on until reaching 0.80 kV when the eighth stage 510 is switched on. Stage 510 is not engaged until t9, and so the voltage decrease at this stage is very low compared to eighth stage 517. As a result of this imbalance, it may take longer for the eighth stage 517 to reach its commanded voltage than for the first stage 510 to reach its commanded voltage after the transition, generating a higher stress on the voltage source 520 of the eighth stage 517, which may result in damage to switches and/or other components of the eighth stage 517.

To reduce the risk of damage entailed by the sequential engaging and disengaging of the stages of the first control circuit 502 of the multi-stage switching unit 500 described in relation to FIGS. 12, and 13, and to decrease an amount of energy lost during the first and second transitions, the alternative control strategy described in method 700 of FIG. 7, where a timing of switching each of the stages 510-517 is adjusted to ensure that all or most of the stages reach an equivalent voltage increase/decrease during the respective engaging and disengaging, and that the voltage imbalance described above is limited.

Figure 14:
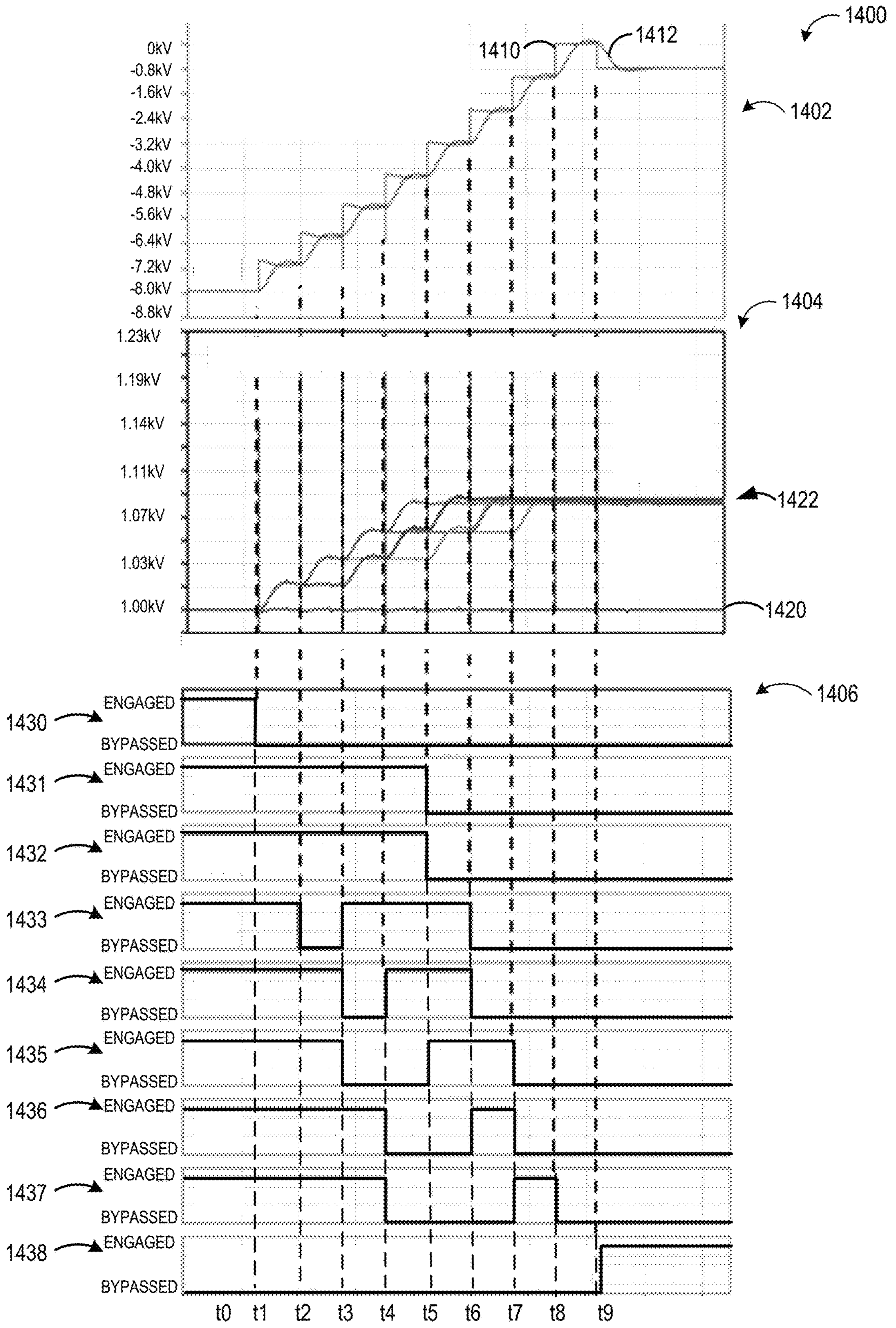
FIG. 14 is a fourth timing diagram showing a sequence of events during a first transition of the interventional imaging system from the gridding voltage to the bias voltage with an optimized protocol, in accordance with one or more embodiments of the present disclosure.

FIG. 14 is a fourth exemplary timing diagram 1400 showing the first transition of FIG. 12, where instead of disengaging stages 510-517 in order, stages 510-517 are disengaged selectively (e.g., out of order) in accordance with the alternative control strategy. Timing diagram 1400 includes three portions, which share a common horizontal axis showing time, where time points of interest during the transition are illustrated by vertical dashed lines. As in FIG. 12, a first portion 1402 shows a change in a combined voltage generated by the stages (e.g., voltages sources 520 and/or voltage source 570) of the switching unit 500 over the first transition, including a first plot 1410 indicating a ladder output voltage and a second plot 1412 indicating a circuit output voltage.

A second portion 1404 shows change in voltage generated by the capacitor (e.g., capacitor 521) of each stage of the first control circuit 502 over time during the first transition. A third portion 1406 indicates an engagement of each stage of switching unit 500 (including the bias voltage generated by the high precision voltage source stage of the second control circuit 504) during the first transition. Each stage may be ENGAGED or BYPASSED (e.g., disengaged). A set of stage plots 1430-1438 correspond to the stages described in relation to stage plots 1230-1238 of FIG. 12. Stage plot 1438 indicates whether the high precision voltage source stage of second control circuit 504 is ENGAGED.

At a time t0, the cathode is gridded, and a voltage of −8.0 kV is applied, as indicated by plots 1410 and 1412 of first portion 1402. All stages are ENGAGED except the high precision voltage source stage of the second control circuit 504, which is bypassed, as indicated by the third portion 1406. As in FIG. 12, between times t1 and t8, the stages 510 to 517 of the first control circuit 502 are BYPASSED as indicated by plots 1430-1437 of third portion 1406. At time t8, no voltage is generated by either the first control circuit 502 or the second control circuit 504, and the cathode receives 0V as shown by plots 1410 and 1412. At time t9, the second control circuit is ENGAGED, and the second, bias voltage is applied to the cathode. However, in contrast to FIG. 12, the stages 510-517 are not bypassed in order (e.g., order of the stages) between t1 and t8. In the depicted embodiment, the stages are bypassed in a series of steps, as follows:

Step 1: At time t1, the first stage 510 is BYPASSED (plot 1430).

Step 2: At time t2, the fourth stage 513 is BYPASSED (plot 1433).

Step 3: At time t3, the fifth and sixth stages 514 and 515 are BYPASSED (plot 1434 and plot 1435) and the fourth stage 513 is ENGAGED (plot 1433).

Step 4: At time t4, the seventh and eighth stages 516 and 517 are BYPASSED (plot 1436 and plot 1437) and the fifth stage 514 is ENGAGED (plot 1434)

Step 5: At time t5, the second and third stages 511 and 512 are BYPASSED (plot 1431 and plot 1432) and the sixth stage 515 is ENGAGED (plot 1435)

Step 6: At time t6, the fourth and fifth stages 513 and 514 are BYPASSED (plot 1433 and plot 1434) and the seventh stage 516 is ENGAGED (plot 1436)

Step 7: At time t7, the sixth and seventh stages 515 and 516 are BYPASSED (plot 1435 and plot 1436) and the eighth stage 517 is ENGAGED (plot 1437)

Step 8: At time t8, the eighth stage 517 (plot 1437) is BYPASSED. No voltage is generated by the first control circuit 502 or by the second control circuit 504.

Step 9: At time t9, the ninth stage 504 (plot 1438, the high precision voltage source stage) is switched on, engaging the second control circuit, and the second, bias voltage is applied to the bias/grid electrode 550 (e.g., to turn the cathode on).

As can be seen in the second portion 1404, as a result of applying the alternative control strategy for disengaging the stages 510-517, the voltage imbalance of FIG. 12 is more limited than in FIG. 12. At time t1, when the first stage 510 is bypassed, plot 1420 shows that the voltage generated at the capacitor 521 of the first stage (and not applied to the cathode) remains at 1.00 kV, as in FIG. 12. However, in contrast to FIG. 12, as stages 511-517 are selectively engaged or bypassed between times t2 and t9 in accordance with the alternative control strategy, the incremental increases in the voltage at each capacitor 521 of stages 511-517 are balanced between the capacitors 521. As a result, at time t8, when no voltage is generated by the first control circuit 502 (as shown in the first portion 1402), plots of the voltages held at each capacitor 521 of stages 511-517 show an equal final voltage 1422. In the depicted embodiment, the equal final voltage 1422 is lower than 1.10 kV. The equal voltage 1422 may be below the threshold voltage for causing damage to switches or other components of stages 511-517, whereby the aging and potentially sudden parts failure due to the capacitor voltage imbalance may not occur.

Figure 15:
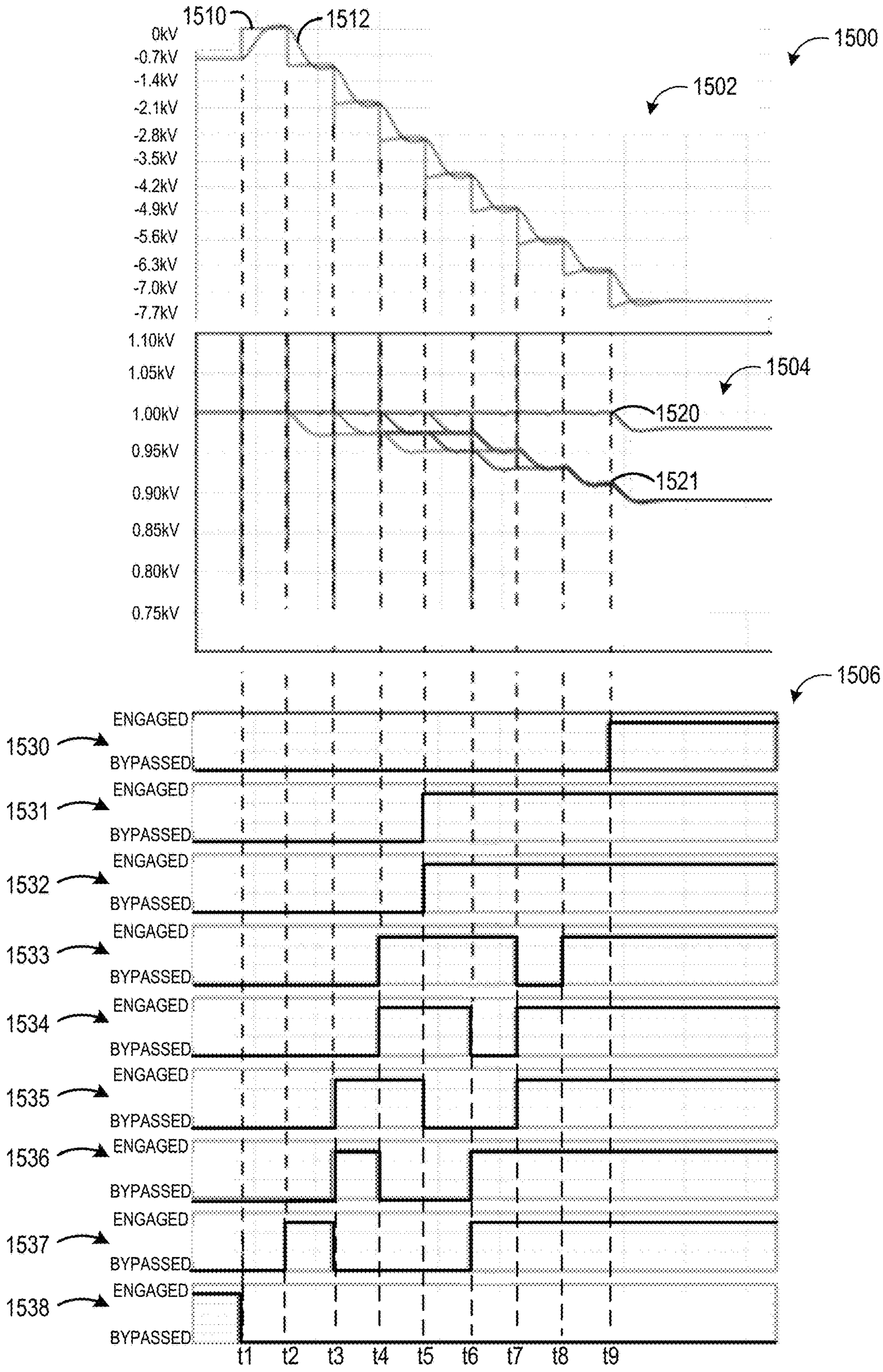
FIG. 15 is a fifth timing diagram showing a sequence of events during a second transition of the interventional imaging system from the bias voltage to the gridding voltage with an optimized protocol, in accordance with one or more embodiments of the present disclosure.

FIG. 15 is a fifth exemplary timing diagram 1500 showing an application of the alternative control strategy for engaging the stages 510-517 during the second transition of FIG. 13, when stages 510-517 are engaged sequentially to achieve the gridding voltage (e.g., to switch off the cathode and stop the generation of X-rays). In contrast with FIG. 13, instead of engaging stages 510-517 in order, stages 510-517 are selectively engaged and/or bypassed in accordance with the alternative control strategy, to avoid the voltage imbalance described above in reference to FIG. 13. Timing diagram 1500 includes three portions, which share a common horizontal axis showing time, where time points of interest during the second transition are illustrated by vertical dashed lines. As in FIG. 13, a first portion 1402 shows a change in a combined voltage generated by the voltage sources (e.g., voltages sources 520 and/or voltage source 570) of the switching unit 500 over the second transition, including a first plot 1510 indicating a ladder output voltage and a second plot 1512 indicating a circuit output voltage.

A second portion 1504 shows change in the voltage generated by the capacitor 521 of each stage of the first control circuit 502 over time during the second transition. A third portion 1506 indicates an engagement of each stage of switching unit 500 (including the bias voltage generated by the high precision voltage source stage of the second control circuit 504) during the second transition. Each stage may be ENGAGED or BYPASSED. A set of stage plots 1530-1538 correspond to the stages described in relation to stage plots 1330-1338 of FIG. 13. Stage plot 1538 indicates whether the high precision voltage source stage of second control circuit 504 is ENGAGED.

At a time t0, the bias voltage of approximately −1.2 kV is applied, as indicated by plots 1510 and 1512 of first portion 1502. All stages are BYPASSED except for the high precision voltage source stage of the second control circuit 504 generating the bias voltage, as indicated by the third portion 1506. At time t1, the high precision voltage source stage 504 is BYPASSED. The voltage applied to the cathode is 0V, as shown by plots 1510 and 1512. As in FIG. 13, between times t2 and t9, the stages 510 to 517 of the first control circuit 502 are ENGAGED, as indicated by plots 1530-1537 of third portion 1406. However, in contrast to FIG. 13, the stages 510-517 are not engaged in order between t2 and t9. In the depicted embodiment, the stages are engaged in a series of steps in accordance with the alternative control strategy. In various embodiments, the steps may be the same as the steps performed during the bypassing of the stages 510-517 shown in FIG. 14, but in an opposite order, as follows:

Step 1: At time t2, the eighth stage 517 (plot 1537) is ENGAGED.

Step 2: At time t3, the sixth and seventh stages 515 and 516 are ENGAGED (plot 1535 and plot 1536) and the eighth stage 517 is BYPASSED (plot 1537)

Step 3: At time t4, the fourth and fifth stages 513 and 514 are ENGAGED (plot 1533 and plot 1534) and the seventh stage 516 is BYPASSED (plot 1536)

Step 4: At time t5, the second and third stages 511 and 512 are ENGAGED (plot 1531 and plot 1532) and the sixth stage 515 is BYPASSED (plot 1535)

Step 5: At time t6, the seventh and eighth stages 516 and 517 are ENGAGED (plot 1536 and plot 1537) and the fifth stage 514 is BYPASSED (plot 1534)

Step 6: At time t7, the fifth and sixth stages 514 and 515 are ENGAGED (plot 1534 and plot 1535) and the fourth stage 513 is BYPASSED (plot 1433).

Step 7: At time t8, the fourth stage 513 is ENGAGED (plot 1533).

Step 8: At time t9, the first stage 510 is ENGAGED (plot 1530).

As can be seen in the second portion 1504, as a result of applying the alternative control strategy for engaging the stages 510-517, the voltage imbalance of FIG. 13 does not occur. By time t9, when the first stage 510 is ENGAGED, a plot 1520 shows that the voltage drop generated at the capacitor 521 of the first stage is still very low, as with plot 1320 of FIG. 13. However, in contrast to FIG. 13, as stages 511-517 are selectively engaged or disengaged between times t2 and t8 in accordance with the alternative control strategy, incremental decreases in the voltage at each capacitor 521 of stages 511-517 are balanced between the capacitors 521. As a result, at time t9, when no voltage is generated by the first control circuit 502 (as shown in the first portion 1502), plots of the voltages held at each capacitor 521 of stages 511-517 show an equal voltage 1521. In the depicted embodiment, the equal voltage 1521 is approximately 0.90 kV. The voltage at both the first stage 510 and the stages 511-517 undergo a further voltage drop after t9, as the voltage applied to the cathode achieves the gridding voltage of −8.0 kV, as described above in reference to FIG. 8 (e.g., from line 808 to line 810). The equal voltage 1521 may be below the threshold voltage for causing damage to switches or other components of stages 511-517, whereby the aging and potentially sudden parts failure due to the capacitor voltage imbalance may not occur. In this way, the stages 510-517 may be selectively disengaged in a first order in accordance with the alternative control strategy to achieve the bias voltage, and selectively engaged in a second order to achieve the gridding voltage, where the second order is the opposite of the first order.

It should be appreciated that FIGS. 12-15 are for illustrative purposes, and in other embodiments, a different number of stages and/or order of selective engagement/disengagement of stages may be used without departing from the scope of this disclosure.

In various embodiments, the steps may be performed by software of the interventional imaging system, in accordance with a protocol for the alternative switching strategy that specifies which stages of stages 510-517 are to be engaged at different times during the first and the second transitions. For example, the protocol may engaged programmatically using a stage engagement matrix, as shown in FIG. 16.

Referring to FIG. 16, an exemplary stage engagement matrix 1600 is shown, in accordance with an embodiment, that may be used to generate an optimized protocol of the interventional imaging system referred to herein to achieve the second transition as described above in reference to FIG. 15. Stage engagement matrix 1600 includes nine numbered rows 1602, corresponding to steps 1-9 of the second transition described above in reference to FIG. 15. Stage engagement matrix 1600 includes eight numbered columns 1604, corresponding to stages 510-517 of the first control circuit 502 of multi-stage switching unit 500. The stages are numbered from eight to one, meaning that a first column 1620 represents the eighth stage 517 of FIG. 15; a second column 1622 represents the seventh stage 516 of FIG. 15; and so on. Thus, at each of the nine steps, a corresponding row 1602 of stage engagement matrix 1600 includes a binary coding in each cell corresponding to each stage of the eight stages, indicating whether the corresponding stage is engaged or disengaged. In the depicted embodiment, if the corresponding stage is engaged, the cell may include a 1, and if the corresponding stage is disengaged, the cell may include a 0.

For example, a first row 1610 includes all zeros, indicating that all eight stages are disengaged and no stages of the first control circuit 502 are engaged during a first step. A second row 1612 includes a one in a first column 1620, and zeros in all other columns, indicating that during the second step, only one stage (e.g., the eighth stage) of the eight stages is engaged (e.g., switched from BYPASSED to ENGAGED). A third row 1614 includes a zero in the first column 1620, a one in a second column 1622, a one in a third column 1624, and zeros in all other columns, indicating that during the third step, the eighth stage is disengaged (e.g., switched from ENGAGED to BYPASSED), and the seventh and sixth stages are engaged. A fourth row 1616 includes a zero in the first column 1620, indicating that the eighth stage is maintained disengaged (e.g., maintained BYPASSED); a zero in the second column 1622, indicating that the seventh stage is disengaged; a one in the third column 1624, indicating that the sixth stage is maintained engaged (e.g., maintained ENGAGED); a one in a fourth column 1626, indicating that a fifth stage is engaged; a one in a fifth column 1628, indicating that a fourth stage is engaged; and zeros in all other columns. The remaining cells of stage engagement matrix 1600 are similarly filled in, such that stage engagement matrix 1600 provides an efficient binary (e.g., machine readable) representation that may be consulted, for example, as a lookup table, by a software routine of the interventional imaging system. The software routine may be performed by a processor of the interventional imaging system.

The technical effect of using a non-consecutive control strategy for engaging and disengaging stages of a control circuit for controlling an electrode voltage of a interventional imaging system during transitioning between a gridding voltage of the interventional imaging system and a bias voltage of the interventional imaging system is that a voltage imbalance between the stages may be reduced, decreasing a risk of damage to components of the control circuit.

The disclosure also provides support for a method for an interventional imaging system, the method comprising: applying a voltage to a gridding electrode of a cathode of the interventional imaging system via a multi-stage switching unit including a first control circuit and a second, different control circuit, during a first transition of the voltage from a first, gridding voltage of the interventional imaging system generated by the first control circuit to a second, bias voltage of the interventional imaging system generated by the second control circuit, selectively bypassing a plurality of stages of the first control circuit sequentially in a first non-consecutive order to decrease the voltage from the first, gridding voltage to a common voltage of the interventional imaging system, and during a second transition of the voltage from the second, bias voltage generated by the second control circuit to the first, gridding voltage generated by the first control circuit, selectively engaging the plurality of stages of the first control circuit sequentially in a second non-consecutive order to increase the voltage from the common voltage to the first, gridding voltage. In a first example of the method, the cathode is a unipolar cathode, and both of the first, gridding voltage and the second, bias voltage are negative voltages. In a second example of the method, optionally including the first example, driving electronics of the unipolar cathode are connected through a cable with a length greater than 40 meters. In a third example of the method, optionally including one or both of the first and second examples: each stage of the plurality of stages of the first control circuit includes a −1 kV voltage source, a capacitor, and at least two switches to bypass or negatively connect the −1 kV voltage source to the cathode, and the second control circuit includes a high precision voltage source capable of generating up to 1.2 kV with a precision of +/−50V, a capacitor, and at least two switches to bypass or negatively connect the high precision voltage source to the cathode. In a fourth example of the method, optionally including one or more or each of the first through third examples: the first, gridding voltage is −8 kV with respect to the common voltage, and the second, bias voltage is between 0 and −1.2 kV with respect to the common voltage. In a fifth example of the method, optionally including one or more or each of the first through fourth examples, the second non-consecutive order is the reverse of the first non-consecutive order. In a sixth example of the method, optionally including one or more or each of the first through fifth examples: selectively bypassing the plurality of stages of the first control circuit sequentially in the first non-consecutive order comprises performing a first sequence of steps, where during each step of the first sequence of steps at least one stage of the plurality of stages is bypassed, and during at least one step of the first sequence of steps, a previously bypassed stage is engaged, and selectively engaging the plurality of stages of the first control circuit sequentially in the second non-consecutive order comprises performing a second sequence of steps, where during each step of the second sequence of steps at least one stage of the plurality of stages is engaged, and during at least one step of the second sequence of steps, a previously engaged stage is bypassed. In a seventh example of the method, optionally including one or more or each of the first through sixth examples, the method further comprises: selectively bypassing the plurality of stages of the first control circuit sequentially in the first non-consecutive order based on a first protocol generated based on a first stage engagement matrix stored in a memory of the interventional imaging system, and selectively engaging the plurality of stages of the first control circuit sequentially in the second non-consecutive order based on a second protocol generated based on a second stage engagement matrix stored in the memory, wherein the first stage engagement matrix and the second stage engagement matrix indicate when each stage of the plurality of stages is to be engaged and when each stage of the plurality of stages is to be bypassed. In a eighth example of the method, optionally including one or more or each of the first through seventh examples, the first stage engagement matrix and the second stage engagement matrix indicate when each stage of the plurality of stages is to be engaged and when each stage of the plurality of stages is to be bypassed via a binary coding where a one indicates that the stage is to be engaged, and a zero indicates that the stage is to be bypassed. In a ninth example of the method, optionally including one or more or each of the first through eighth examples, the first protocol and the second protocol are optimized to reduce a voltage imbalance between stages of the plurality of stages.

The disclosure also provides support for an interventional imaging system, comprising: an X-ray source including a unipolar cathode, a multi-stage switching unit including a first control circuit configured to generate a first, gridding voltage at a gridding electrode of the unipolar cathode via a plurality of stages of the multi-stage switching unit, and a second control circuit configured to generate a second, bias voltage at the gridding electrode, and a controller operably connected to the X-ray source and configured to: when transitioning from the gridding voltage to the bias voltage, selectively bypass the plurality of stages of the first control circuit sequentially in a first non-consecutive order to decrease a voltage applied to the gridding electrode, and when transitioning from the bias voltage to the gridding voltage, selectively engage the plurality of stages of the first control circuit sequentially in a second non-consecutive order to increase the voltage applied to the gridding electrode, the second non-consecutive order the reverse of the first non-consecutive order. In a first example of the system, both of the first, gridding voltage and the second, bias voltage are negative voltages with respect to a common voltage of the interventional imaging system, and driving electronics of the unipolar cathode are connected through a cable with a length greater than 40 meters. In a second example of the system, optionally including the first example: each of the plurality of stages of the first control circuit includes a −1 kV voltage source, a capacitor, and at least two switches to bypass or negatively connect the −1 kV voltage source to the unipolar cathode, and the second control circuit includes a high precision voltage source capable of generating up to 1.2 kV with a precision of +/−50V, a capacitor, and at least two switches to bypass or negatively connect the high precision voltage source to the unipolar cathode. In a third example of the system, optionally including one or both of the first and second examples, the controller is further configured to: selectively bypass the plurality of stages of the first control circuit sequentially in the first non-consecutive order by bypassing at least one stage of the plurality of stages at each step of a first sequence of steps, and engaging a previously bypassed stage during at least one step of the first sequence of steps, and selectively engage the plurality of stages of the first control circuit sequentially in the second non-consecutive order by engaging at least one stage of the plurality of stages at each step of a second sequence of steps, and bypassing a previously engaged stage during at least one step of the second sequence of steps. In a fourth example of the system, optionally including one or more or each of the first through third examples, the controller is further configured to: selectively bypass the plurality of stages of the first control circuit sequentially in the first non-consecutive order based on a first protocol generated from a first stage engagement matrix stored in a memory of the interventional imaging system, and selectively engage the plurality of stages of the first control circuit sequentially in the second non-consecutive order based on a second protocol generated from a second stage engagement matrix stored in the memory, wherein the first stage engagement matrix and the second stage engagement matrix indicate when each stage of the plurality of stages is to be engaged and when each stage of the plurality of stages is to be bypassed. In a fifth example of the system, optionally including one or more or each of the first through fourth examples, the first stage engagement matrix and the second stage engagement matrix indicate when each stage of the plurality of stages is to be engaged and when each stage of the plurality of stages is to be bypassed via a binary coding where a one indicates engaging a relevant stage, and a zero indicates bypassing the stage. In a sixth example of the system, optionally including one or more or each of the first through fifth examples, the first protocol and the second protocol are optimized to reduce a voltage imbalance between stages of the plurality of stages. In a seventh example of the system, optionally including one or more or each of the first through sixth examples: in a first condition where the plurality of stages of the first control circuit are sequentially bypassed in a consecutive order and not in the first non-consecutive order, the voltage imbalance between the stages causes a voltage at a stage to exceed a threshold voltage, the threshold voltage a voltage at which damage may be caused to at least one component of the stage, in a second condition where the plurality of stages of the first control circuit are sequentially bypassed in the first non-consecutive order, the voltage imbalance does not cause the voltage at the stage to exceed the threshold voltage.

The disclosure also provides support for a method for an interventional imaging system, the method comprising: in response to receiving an instruction to switch on a cathode of the interventional imaging system: retrieving a first stage engagement matrix from a memory of the interventional imaging system, the first stage engagement matrix including a binary encoding indicating a first non-consecutive order for bypassing and/or engaging a plurality of stages of a first control circuit of a multi-stage switching unit of the interventional imaging system, generating a first protocol for controlling the first control circuit based on the first stage engagement matrix, decreasing a voltage supplied to a gridding electrode of the cathode from a first, gridding voltage of the interventional imaging system to a common voltage of the interventional imaging system in accordance with the first protocol, and increasing the voltage from the common voltage to a second, bias voltage of the interventional imaging system via a second control circuit of the multi-stage switching unit, and in response to receiving an instruction to switch the cathode off: generating a second protocol for controlling the first control circuit based on a second non-consecutive order, the second non-consecutive order the reverse of the first non-consecutive order, decreasing the voltage from the second, bias voltage to the common voltage via the second control circuit, and increasing the voltage from the common voltage to the first, gridding voltage in accordance with the second protocol. In a first example of the method, the second non-consecutive order is indicated by a binary encoding of a second stage engagement matrix stored in the memory.

When introducing elements of various embodiments of the present disclosure, the articles “a,” “an,” and “the” are intended to mean that there are one or more of the elements.

The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative and should not be construed to be limiting in any manner.

The invention claimed is:

1. A method for an interventional imaging system, the method comprising:

applying a voltage to a gridding electrode of a cathode of the interventional imaging system via a multi-stage switching unit including a first control circuit and a second control circuit different from the first control circuit;

during a first transition of the voltage from a first, gridding voltage of the interventional imaging system generated by the first control circuit to a second, bias voltage of the interventional imaging system generated by the second control circuit, selectively bypassing a plurality of stages of the first control circuit sequentially in a first non-consecutive order to decrease the voltage from the first, gridding voltage to a common voltage of the interventional imaging system; and during a second transition of the voltage from the second, bias voltage generated by the second control circuit to the first, gridding voltage generated by the first control circuit, selectively engaging the plurality of stages of the first control circuit sequentially in a second non-consecutive order to increase the voltage from the common voltage to the first, gridding voltage.

2. The method of claim 1, wherein the cathode is a unipolar cathode, and both of the first, gridding voltage and the second, bias voltage are negative voltages.

3. The method of claim 2, wherein the voltage is applied to the gridding electrode of the cathode of the interventional imaging system from voltage control modules that are connected to the gridding electrode through a cable with a length greater than 40 meters.

4. The method of claim 1, wherein:

each stage of the plurality of stages of the first control circuit includes a −1 kV voltage source, a capacitor, and at least two switches to bypass or negatively connect the −1 kV voltage source to the cathode; and the second control circuit includes a high precision voltage source capable of generating up to 1.2 kV with a precision of +/−50V, a capacitor, and at least two switches to bypass or negatively connect the high precision voltage source to the cathode.

5. The method of claim 4, wherein:

the first, gridding voltage is −8 kV with respect to the common voltage, and the second, bias voltage is between 0 and −1.2 kV with respect to the common voltage.

6. The method of claim 1, wherein the second non-consecutive order is a reverse of the first non-consecutive order.

7. The method of claim 1, wherein:

selectively bypassing the plurality of stages of the first control circuit sequentially in the first non-consecutive order to decrease the voltage from the first, gridding voltage to the common voltage of the interventional imaging system comprises performing a first sequence of steps, where during each step of the first sequence of steps at least one stage of the plurality of stages is bypassed, and during at least one step of the first sequence of steps, a previously bypassed stage is engaged; and selectively engaging the plurality of stages of the first control circuit sequentially in the second non-consecutive order to increase the voltage from the common voltage to the first, gridding voltage comprises performing a second sequence of steps, where during each step of the second sequence of steps at least one stage of the plurality of stages is engaged, and during at least one step of the second sequence of steps, a previously engaged stage is bypassed.

8. The method of claim 1, further comprising:

selectively bypassing the plurality of stages of the first control circuit sequentially in the first non-consecutive order to decrease the voltage from the first, gridding voltage to the common voltage of the interventional imaging system based on a first protocol generated based on a first stage engagement matrix stored in a memory of the interventional imaging system; and selectively engaging the plurality of stages of the first control circuit sequentially in the second non-consecutive order to increase the voltage from the common voltage to the first, gridding voltage based on a second protocol generated based on a second stage engagement matrix stored in the memory;

wherein the first stage engagement matrix and the second stage engagement matrix indicate when each stage of the plurality of stages is to be engaged, and when each stage of the plurality of stages is to be bypassed.

9. The method of claim 8, wherein the first stage engagement matrix and the second stage engagement matrix indicate when each stage of the plurality of stages is to be engaged and when each stage of the plurality of stages is to be bypassed via a binary coding, where a one indicates that a stage is to be engaged and a zero indicates that a stage is to be bypassed.

10. The method of claim 8, wherein the first protocol and the second protocol are optimized to reduce a voltage imbalance between stages of the plurality of stages.

11. An interventional imaging system, comprising:

an X-ray source including a unipolar cathode and a gridding electrode;

a multi-stage switching unit including a first control circuit having a plurality of stages configured to generate a first, gridding voltage at the gridding electrode of the unipolar cathode via the plurality of stages of the multi-stage switching unit, and a second control circuit configured to generate a second, bias voltage at the gridding electrode; and a controller operably connected to the X-ray source and configured to:

when transitioning from the first, gridding voltage to the second, bias voltage, selectively bypass the plurality of stages of the first control circuit sequentially in a first non-consecutive order to decrease a voltage applied to the gridding electrode; and when transitioning from the bias voltage to the gridding voltage, selectively engage the plurality of stages of the first control circuit sequentially in a second non-consecutive order to increase the voltage applied to the gridding electrode, the second non-consecutive order being a reverse of the first non-consecutive order.

12. The interventional imaging system of claim 11, wherein the first, gridding voltage and the second, bias voltage are generated at the gridding electrode via a cable with a length greater than 40 meters, and wherein both of the first, gridding voltage and the second, bias voltage are negative voltages with respect to a common voltage of the interventional imaging system.

13. The interventional imaging system of claim 11, wherein:

each of the plurality of stages of the first control circuit includes a −1 kV voltage source, a capacitor, and at least two switches to bypass or negatively connect the −1 kV voltage source to the unipolar cathode; and the second control circuit includes a high precision voltage source capable of generating up to 1.2 kV with a precision of +/−50V, a capacitor, and at least two switches to bypass or negatively connect the high precision voltage source to the unipolar cathode.

14. The interventional imaging system of claim 13, wherein the controller is further configured to:

selectively bypass the plurality of stages of the first control circuit sequentially in the first non-consecutive order to decrease the voltage applied to the gridding electrode by bypassing at least one stage of the plurality of stages at each step of a first sequence of steps, and engaging a previously bypassed stage during at least one step of the first sequence of steps; and selectively engage the plurality of stages of the first control circuit sequentially in the second non-consecutive order to increase the voltage applied to the gridding electrode by engaging at least one stage of the plurality of stages at each step of a second sequence of steps, and bypassing a previously engaged stage during at least one step of the second sequence of steps.

15. The interventional imaging system of claim 14, further comprising a memory, wherein the controller is further configured to:

selectively bypass the plurality of stages of the first control circuit sequentially in the first non-consecutive order to decrease the voltage applied to the gridding electrode based on a first protocol generated from a first stage engagement matrix stored in the memory of the interventional imaging system; and selectively engage the plurality of stages of the first control circuit sequentially in the second non-consecutive order to increase the voltage applied to the gridding electrode based on a second protocol generated from a second stage engagement matrix stored in the memory;

wherein the first stage engagement matrix and the second stage engagement matrix indicate when each stage of the plurality of stages is to be engaged, and when each stage of the plurality of stages is to be bypassed.

16. The interventional imaging system of claim 15, wherein the first stage engagement matrix and the second stage engagement matrix indicate when each stage of the plurality of stages is to be engaged and when each stage of the plurality of stages is to be bypassed via a binary coding, where a one indicates engaging a relevant stage and a zero indicates bypassing a stage.

17. A method for an interventional imaging system, the method comprising:

in response to receiving an instruction to switch on a cathode of the interventional imaging system:

retrieving a first stage engagement matrix from a memory of the interventional imaging system, the first stage engagement matrix including a binary encoding indicating a first non-consecutive order for bypassing and/or engaging a plurality of stages of a first control circuit of a multi-stage switching unit of the interventional imaging system;

generating a first protocol for controlling the first control circuit based on the first stage engagement matrix;

decreasing a voltage supplied to a gridding electrode of the cathode from a first, gridding voltage of the interventional imaging system to a common voltage of the interventional imaging system in accordance with the first protocol; and increasing the voltage from the common voltage to a second, bias voltage of the interventional imaging system via a second control circuit of the multi-stage switching unit; and in response to receiving an instruction to switch the cathode off:

generating a second protocol for controlling the first control circuit based on a second non-consecutive order, the second non-consecutive order being a reverse of the first non-consecutive order;

decreasing the voltage supplied to the gridding electrode from the second, bias voltage to the common voltage via the second control circuit; and increasing the voltage from the common voltage to the first, gridding voltage in accordance with the second protocol.

18. The method of claim 17, wherein the second non-consecutive order is indicated by a binary encoding of a second stage engagement matrix stored in the memory of the interventional imaging system.

* * * * *